(12) United States Patent
Wietfeldt et al.

(10) Patent No.: US 10,515,044 B2
(45) Date of Patent: Dec. 24, 2019

(54) COMMUNICATING HETEROGENEOUS VIRTUAL GENERAL-PURPOSE INPUT/OUTPUT MESSAGES OVER AN I3C BUS

(71) Applicant: QUALCOMM Incorporated, San Diego, CA (US)

(72) Inventors: Richard Dominic Wietfeldt, San Diego, CA (US); Radu Pitigoi-Aron, San Jose, CA (US); Lalan Jee Mishra, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/142,419

(22) Filed: Sep. 26, 2018

(65) Prior Publication Data

US 2019/0129881 A1 May 2, 2019

Related U.S. Application Data

(60) Provisional application No. 62/580,341, filed on Nov. 1, 2017.

(51) Int. Cl.
*G06F 13/20* (2006.01)
*G06F 13/40* (2006.01)
*G06F 9/54* (2006.01)
*G06F 13/42* (2006.01)

(52) U.S. Cl.
CPC ......... *G06F 13/4068* (2013.01); *G06F 9/542* (2013.01); *G06F 13/4282* (2013.01)

(58) Field of Classification Search
CPC .................................................. G06F 13/4068
See application file for complete search history.

(56) References Cited

U.S. PATENT DOCUMENTS

| | | | |
|---|---|---|---|
| 10,241,953 B2* | 3/2019 | Mishra | G06F 13/4282 |
| 2003/0061431 A1* | 3/2003 | Mears | G06F 13/28 710/305 |
| 2017/0039162 A1 | 2/2017 | Mishra et al. | |

(Continued)

OTHER PUBLICATIONS

International Search Report and Written Opinion—PCT/US2018/053111—ISA/EPO—dated Jan. 14, 2019.

*Primary Examiner* — Tammara R Peyton
(74) *Attorney, Agent, or Firm* — Loza & Loza LLP

(57) ABSTRACT

Systems, methods, and apparatus for communication virtualized general-purpose input/output (GPIO) signals over a serial communication link. An apparatus includes a serial bus, and an originating device and destination device coupled to the serial bus. The originating device may be configured to generate a first virtual GPIO packet that carries a payload representative of signaling state of physical GPIO in the originating device, generate a second virtual GPIO packet that carries a payload representative of an event generated by a processor in the originating device, and transmit the first and second virtual GPIO packets on the serial bus. The destination device may be configured to receive the second virtual GPIO packet from the serial bus, and communicate the event to a processor of the destination device or modify signaling state of physical GPIO in the destination device in accordance with the payload of the second virtual GPIO packet.

26 Claims, 22 Drawing Sheets

(56) References Cited

U.S. PATENT DOCUMENTS

| | | |
|---|---|---|
| 2017/0075852 A1 | 3/2017 | Mishra et al. |
| 2017/0168966 A1 | 6/2017 | Mishra et al. |
| 2018/0329838 A1* | 11/2018 | Mishra ................ G06F 13/4291 |
| 2018/0359117 A1* | 12/2018 | Wietfeldt ............ H04L 12/5601 |
| 2019/0050366 A1* | 2/2019 | Mishra ................ G06F 13/4282 |

* cited by examiner

COMMUNICATING HETEROGENEOUS VIRTUAL GENERAL-PURPOSE INPUT/OUTPUT MESSAGES OVER AN I3C BUS

PRIORITY CLAIM

This application claims priority to and the benefit of U.S. Provisional Patent Application Ser. No. 62/580,341 filed in the U.S. Patent Office on Nov. 1, 2017, the entire content of this application being incorporated herein by reference as if fully set forth below in its entirety and for all applicable purposes.

TECHNICAL FIELD

The present disclosure relates generally to serial communication and input/output pin configuration and, more particularly, to transmission of virtual general-purpose input/output data transmitted in groups of bits containing both input and output state information.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, such as a serial bus or a parallel bus. General-purpose serial interfaces are known in the industry, including the Inter-Integrated Circuit (I2C or I²C) serial bus and its derivatives and alternatives. Certain serial interface standards and protocols are defined by the Mobile Industry Processor Interface (MIPI) Alliance, including the I3C, system power management interface (SPMI), and the Radio Frequency Front-End (RFFE) interface standards and protocols.

The I2C serial bus is a serial, single-ended computer bus that was intended for use in connecting low-speed peripherals to a processor. Some interfaces provide multi-master buses in which two or more devices can serve as a bus master for different messages transmitted on the serial bus. The RFFE interface defines a communication interface that may be used for controlling various radio frequency (RF) front-end devices, including power amplifier (PA), low-noise amplifiers (LNAs), antenna tuners, filters, sensors, power management devices, switches, etc. These devices may be collocated in a single IC device or provided in multiple IC devices. In a mobile communications device, multiple antennas and radio transceivers may support multiple concurrent RF links.

In many instances, a number of command and control signals are employed to connect different component devices in mobile communication devices. These connections consume precious general-purpose input/output (GPIO) pins within the mobile communication devices and it would be desirable to replace the physical interconnects with signals carried in information transmitted over existing serial data links. However, the serial data links are associated with latencies that can prevent conversion of physical command and control signals to virtual signals, particularly in real-time embedded system applications supported by mobile communication devices that define firm transmission deadlines.

As mobile communication devices continue to include a greater level of functionality, improved serial communication techniques are needed to support transmission of mixed virtual GPIO state information between peripherals and application processors.

SUMMARY

Certain aspects of the disclosure relate to systems, apparatus, methods and techniques that can provide optimized low-latency communications between different devices such that physical GPIO state and signals may be carried as virtual GPIO state and signals. One or more virtual GPIO finite state machines (VGI FSMs) are provided that can consolidate heterogeneous GPIO state information of multiple types and from multiple sources, and distribute the state information to one or more devices over a data communication bus. In one aspect, heterogeneous GPIO state information includes information corresponding to input and output GPIO pins.

In various aspects of the disclosure, a method performed at an originating device coupled to a serial bus includes representing signaling state of physical GPIO in one or more bits of a first virtual GPIO message, transmitting the first virtual GPIO message over the serial bus in a first packet, representing an event generated by a processor of the originating device in one or more bits of a second virtual GPIO message, and transmitting the second virtual GPIO message over the serial bus in a second packet.

In certain aspects, the method includes determining a transaction identifier associated with the event, and encoding the transaction identifier in the second packet. The transaction identifier may indicate a source of the event and a destination of the event. The second packet may be transmitted over the serial bus to the destination of the event. The transaction identifier identifies a physical GPIO pin as the destination of the event. The serial bus may be operated in accordance with an I3C protocol, and the second packet may include a command code identifying the second packet as a virtual GPIO packet. The transaction identifier may be encoded in the command code or in a sub-command code.

In some aspects, the method includes determining a transaction identifier associated with the first packet, and transmitting the transaction identifier in the first packet. The transaction identifier may indicate a physical GPIO pin as a source of the first virtual GPIO message and may designate a consumer of software events as a destination of the first virtual GPIO message. The serial bus may be operated in accordance with an I3C protocol. The first packet may include a command code associated with virtual GPIO packets, and the transaction identifier may be encoded in the command code or a sub-command code.

In some aspects, the method includes determining a transaction identifier associated with the first packet. The transaction identifier indicates a software-controlled GPIO pin as source of the first virtual GPIO message and designates a consumer of software events to be a destination of the first virtual GPIO message, where the first packet includes the transaction identifier. The serial bus may be operated in accordance with an I3C protocol and the first packet may include a command code associated with virtual GPIO packets with the transaction identifier encoded in the command code or a sub-command code.

In various aspects of the disclosure, a method performed at a destination device coupled to a serial bus includes receiving a packet from the serial bus, the packet including virtual GPIO state information, decoding a transaction identifier provided in the packet, translating the virtual GPIO state information to a software event to be processed by the destination device when the transaction identifier has a first value and changing state of a physical GPIO pin in the destination device based on the virtual GPIO state information when the transaction identifier has a second value.

In various aspects of the disclosure, a transitory or non-transitory processor-readable storage medium having code stored thereon for representing signaling state of physical GPIO in one or more bits of a first virtual GPIO message, transmitting the first virtual GPIO message over the serial bus in a first packet, representing an event generated by a processor of the originating device in one or more bits of a second virtual GPIO message, and transmitting the second virtual GPIO message over a serial bus in a second packet.

In various aspects of the disclosure, a data communication apparatus has a serial bus, an originating device coupled to the serial bus, and a destination device coupled to the serial bus. The originating device has a finite state machine configured to generate a first virtual GPIO packet that carries a payload representative of signaling state of physical GPIO in the originating device, transmit the first virtual GPIO packet on the serial bus, generate a second virtual GPIO packet that carries a payload representative of an event generated by a processor in the originating device, and transmit the second virtual GPIO packet over the serial bus. The destination device has a finite state machine configured to receive the second virtual GPIO packet from the serial bus, and communicate the event to a processor of the destination device or modify signaling state of physical GPIO in the destination device in accordance with the payload of the second virtual GPIO packet.

DETAILED DESCRIPTION

Figure 1:
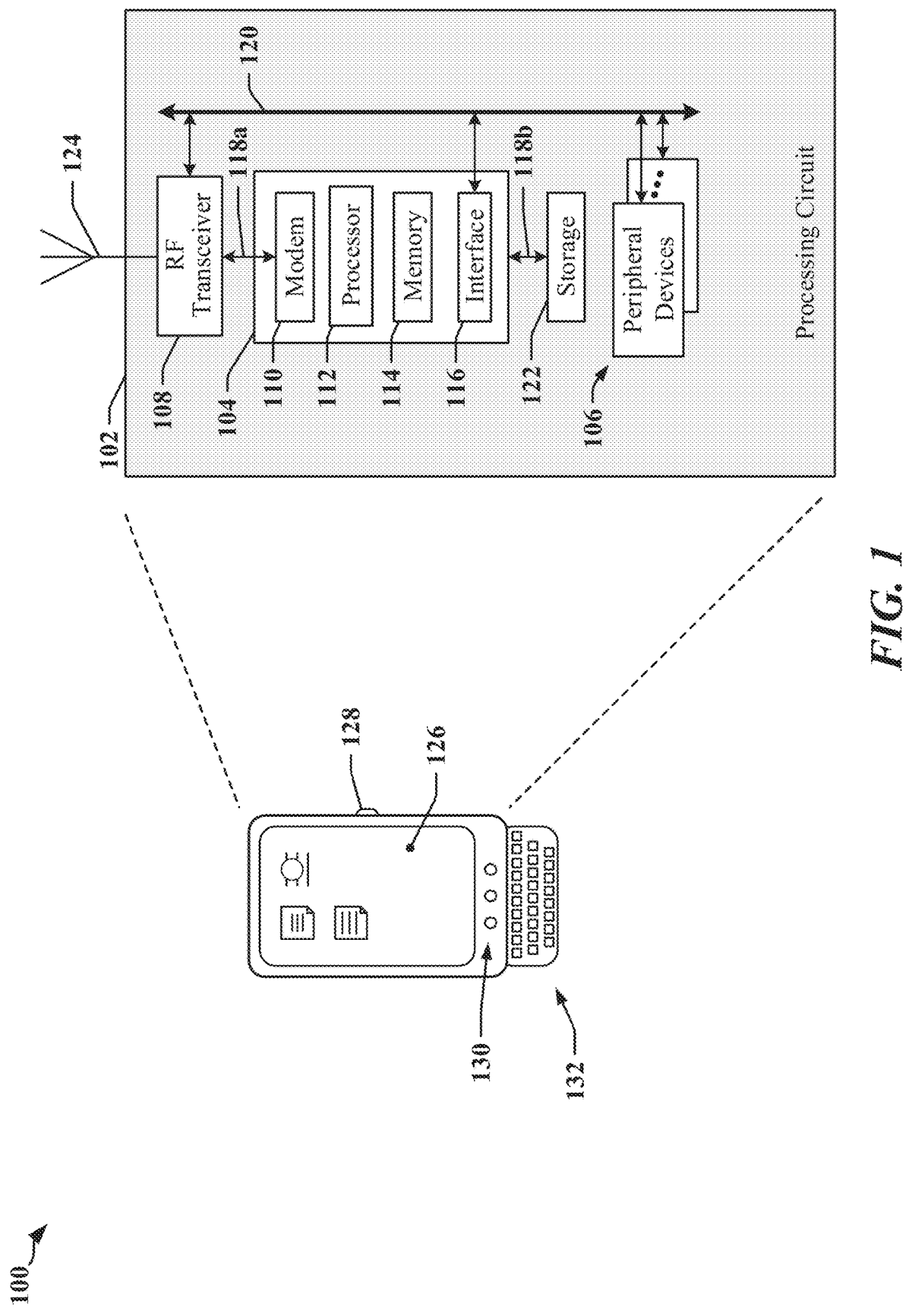
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include multiple SoCs and other IC devices often employ a shared communication interface that may include a serial bus or other data communication link to connect processors with modems and other peripherals. The serial bus or other data communication link may be operated in accordance with multiple standards or protocols defined. In one example, a serial bus may be operated in accordance with I2C, I3C, SPMI, and/or RFFE protocols. According to certain aspects disclosed herein, the signaling state of a GPIO pin, trace, connector or terminal may be represented in one or more bits of virtual GPIO state information transmitted in a VGI message over a data communication link Virtual GPIO state information may be transmitted over a variety of communication links, including links that include wired and wireless communication links. For example, virtual GPIO state information can be packetized or otherwise formatted for transmission over wireless networks including Bluetooth, Wireless LAN, cellular networks, etc. Examples involving wired communication links are described herein to facilitate understanding of certain aspects. These aspects can equally apply to implementations in which transmission of GPIO state information includes transmission over wireless networks.

Certain aspects disclosed herein provide methods, circuits and systems that are adapted to enable a device to represent software events and software-initiated events in virtual GPIO state information that can be transmitted in VGI messages over a serial communication link In one example, an apparatus includes a serial bus that communicatively couples an originating device and destination device. The originating device may be configured to generate a first virtual GPIO packet that carries a payload representative of signaling state of physical GPIO in the originating device, generate a second virtual GPIO packet that carries a payload representative of an event generated by a processor in the originating device, and transmit the first and second virtual GPIO packets on the serial bus. The destination device may be configured to receive the second virtual GPIO packet from the serial bus, and communicate the event to a processor of the destination device or modify signaling state of physical GPIO in the destination device in accordance with the payload of the second virtual GPIO packet.

Examples of Apparatus that Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an example of an apparatus 100 that may employ a data communication bus. The apparatus 100 may include an SoC a processing circuit 102 having multiple circuits or devices 104, 106 and/or 108, which may be implemented in one or more ASICs or in an SoC. In one example, the apparatus 100 may be a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with standards-defined communication specifications or protocols. The processing circuit 102 may include or control a power management function that configures and manages the operation of the apparatus 100.

Figure 2:
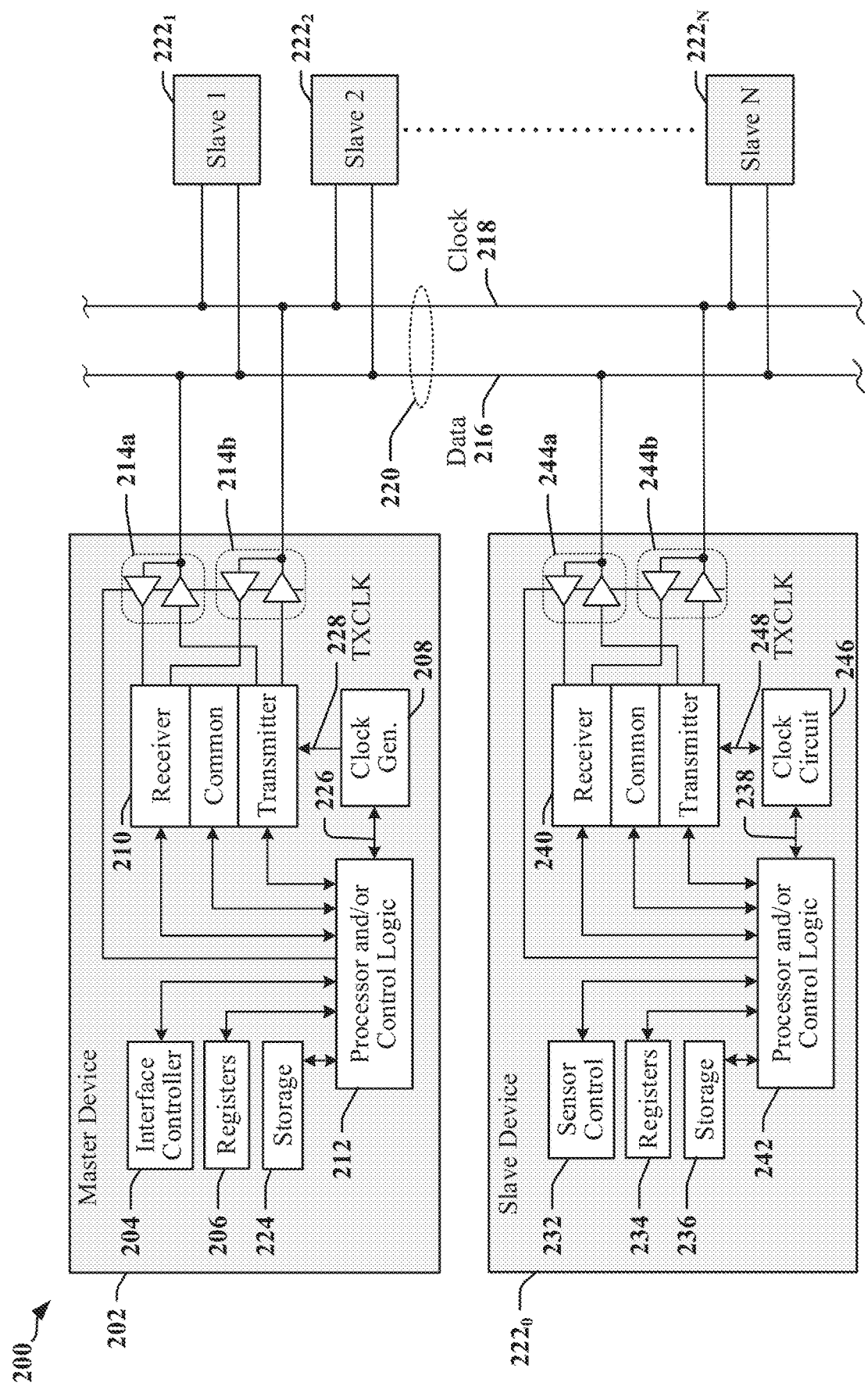
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, and/or other such components or devices. In some examples, one or more of the slave devices $222_0$-$222_N$ may be used to control, manage or monitor a sensor device. Communications between devices 202 and $222_0$-$222_N$ over the serial bus 220 is controlled by a bus master 202. Certain types of bus can support multiple bus masters 202.

In one example, a master device 202 may include an interface controller 204 that manages access to the serial bus, configures dynamic addresses for slave devices $222_0$-$222_N$ and/or generates a clock signal 228 to be transmitted on a clock line 218 of the serial bus 220. The master device 202 may include configuration registers 206 or other storage 224 and other control logic 212 configured to handle protocols and/or higher level functions. The control logic 212 may include a processing circuit having a processing device such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit having a processing device such as a state machine, sequencer, signal processor or general-purpose processor. The transceiver 240 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 228 may be derived from a signal received from the clock line 218. Other timing clocks 238 may be used by the control logic 242 and other functions, circuits or modules.

The serial bus 220 may be operated in accordance with an RFFE, I2C, I3C, SPMI, or other protocol. In some instances, two or more devices 202, $222_0$-$222_N$ may be configured to operate as a bus master on the serial bus 220.

In some implementations, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, data is transmitted on a data line 216 of the serial bus 220 based on timing information provided in a clock signal transmitted on the clock line 218 of the serial bus 220. In some instances, data may be encoded in the signaling state, or transitions in signaling state of both the data line 216 and the clock line 218.

Figure 3:
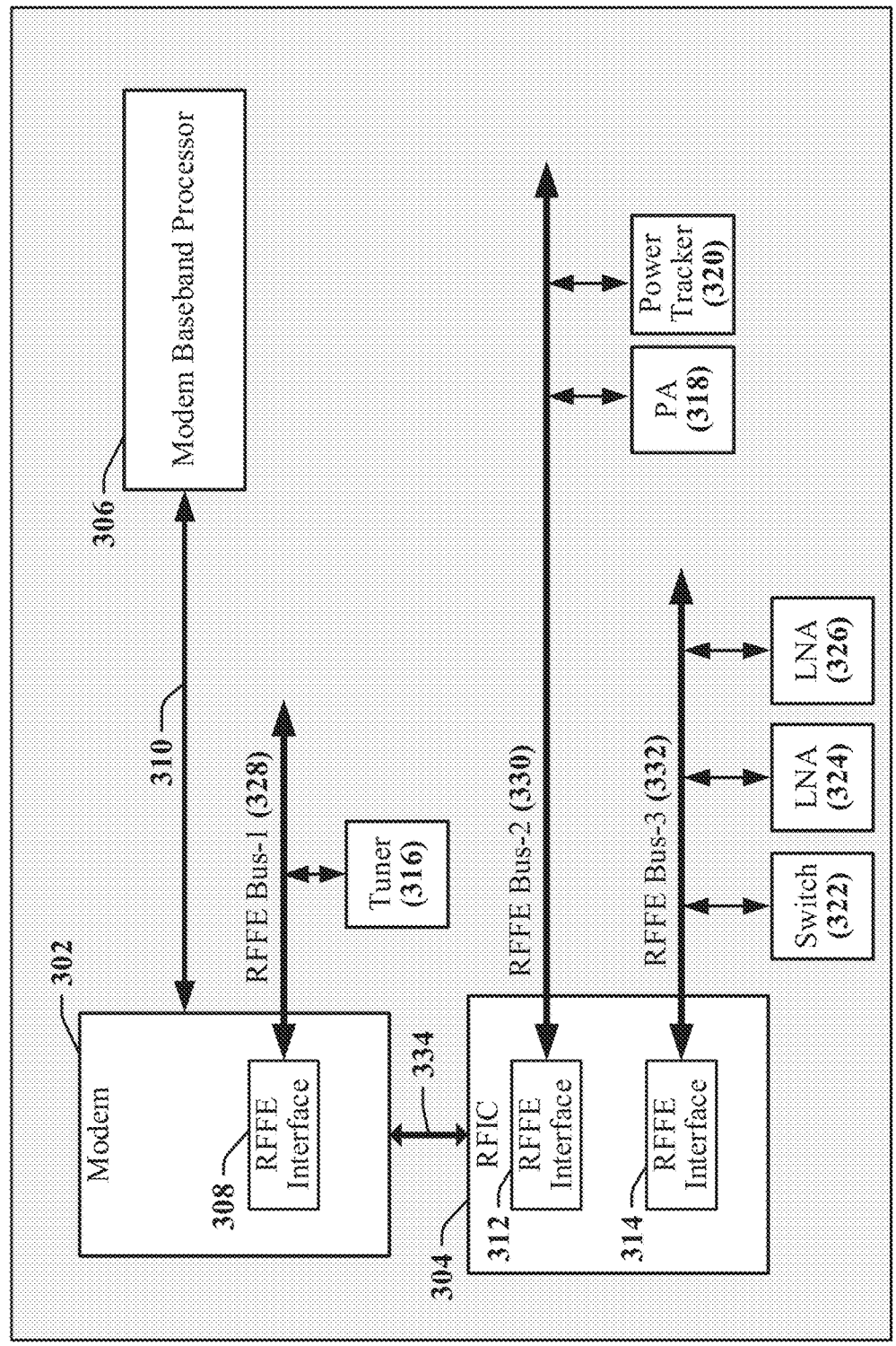
FIG. 3 illustrates a system that uses multiple RFFE buses to couple various radio frequency front-end devices.

FIG. 3 illustrates certain aspects of an apparatus 300 that includes multiple RFFE buses 328, 330, 332 configured coupled to various RF front-end devices 316, 318, 320, 322, 324, 326. A modem 302 includes an RFFE interface 308 that couples the modem 302 to a first RFFE bus 328. The modem 302 may communicate with a baseband processor 306 and a Radio-Frequency IC (RFIC 304) through one or more communication links 310, 334. The illustrated apparatus 300 may be embodied in one or more of a mobile communication device, a mobile telephone, a mobile computing system, a mobile telephone, a notebook computer, a tablet computing device, a media player, a gaming device, a wearable computing and/or communications device, an appliance, or the like.

In various examples, the apparatus 300 may be implemented with one or more baseband processors 306, modems 304, RFICs 304, multiple communications links 310, 334, multiple RFFE buses 328, 330, 332 and/or other types of buses. The apparatus 300 may include other processors, circuits, modules and may be configured for various operations and/or different functionalities. In the example illustrated in FIG. 3, the Modem is coupled to an RF tuner 316 through its RFFE interface 308 and the first RFFE bus 328. The RFIC 304 may include one or more RFFE interfaces 312, 314, controllers, state machines and/or processors that can configure and control certain aspects of the RF front-end. The RFIC 304 may communicate with a PA 318 and a power tracking module 320 through a first of its RFFE interfaces 312 and the second RFFE, bus 330. The RFIC 304 may communicate with a switch 322 and one or more LNAs 324, 326.

Bus latency can affect the ability of a serial bus to handle high-priority, real-time and/or other time-constrained messages. Low-latency messages, or messages requiring low bus latency, may relate to sensor status, device-generated real-time events and virtualized general-purpose input/output (GPIO). In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 322, LNAs 324, 326, PAs 318 and other types of device that operate concurrently in a manner that can generate inter-device interference, or that could potentially cause damage to one or more active devices through high-power electromagnetic interference. Devices that can interfere with one another may exchange coexistence management (CxM) messages to permit each device to signal imminent actions that may result in interference or conflict. CxM messages may be used to manage operation of shared components including a switch 322, LNA 324, 326, PA 318 and/or an antenna.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

In accordance with certain aspects disclosed herein, a two-wire serial bus may be adapted to operate alternately in a conventional two-wire mode and for a one-wire mode. In one example, the serial bus may be operated according to RFFE protocols such that the clock and data line are used for communication with two-wire slave devices coupled to the serial bus and the data line is used without a clock signal for communication with one-wire slave devices coupled to the serial bus. The bus master may use pulse-width modulation to encode data transmitted to one-wire slave devices.

Signaling Virtual GPIO Configuration Information

Figure 4:
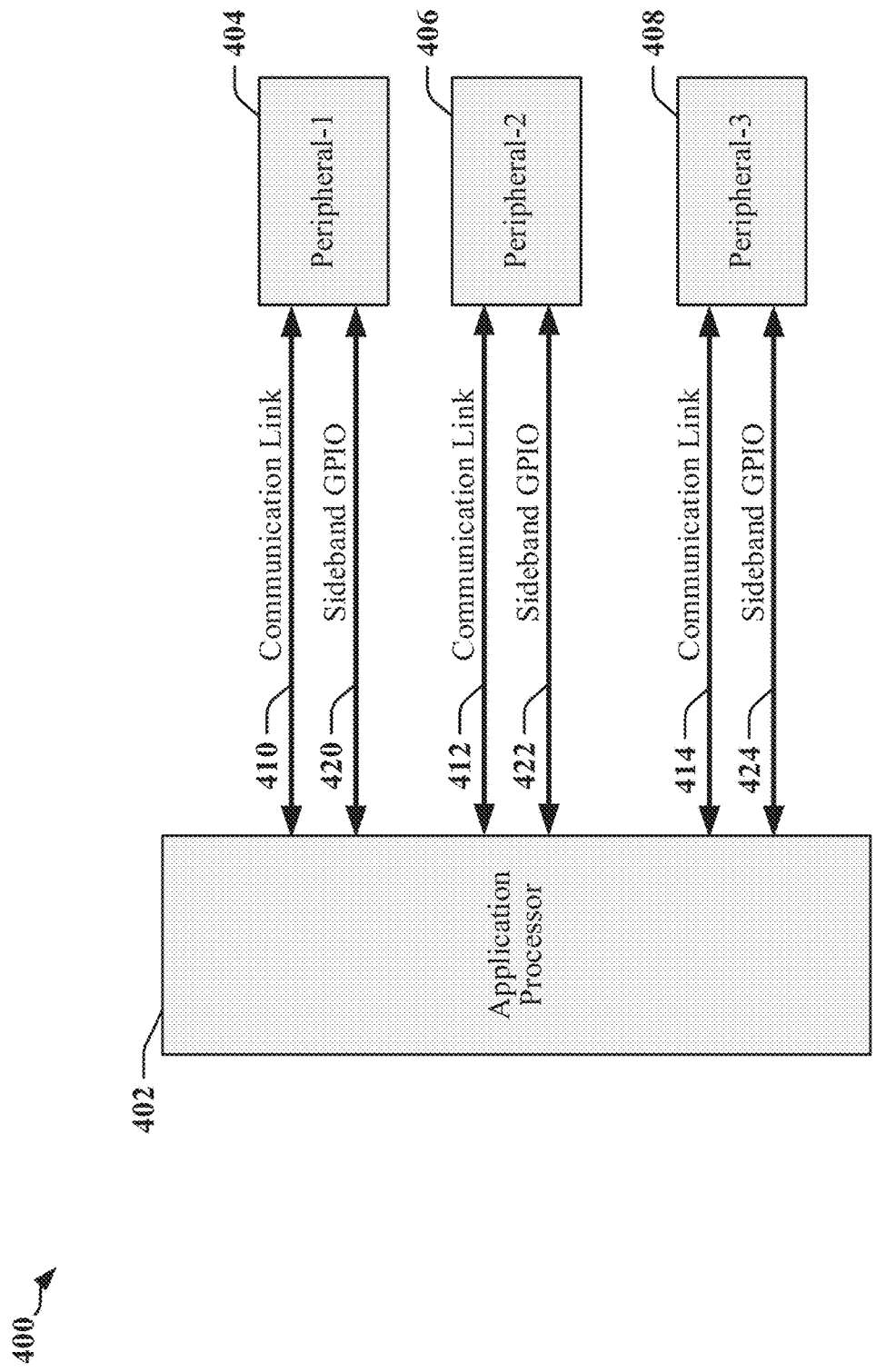
FIG. 4 illustrates an apparatus that includes an Application Processor and multiple peripheral devices that may be adapted according to certain aspects disclosed herein.

FIG. 4 illustrates an apparatus 400 that includes an Application Processor 402 and multiple peripheral devices 404, 406, 408. In the example, each peripheral device 404, 406, 408 communicates with the Application Processor 402 over a respective communication link 410, 412, 414 that may be operated independently and/or in accordance with mutually different protocols. Communication between the Application Processor 402 and each peripheral device 404, 406, 408 may involve additional wires that carry control or command signals between the Application Processor 402 and the peripheral devices 404, 406, 408. These additional wires may be referred to as sideband general purpose input/output (sideband GPIO 420, 422, 424), and in some instances the number of connections needed for sideband GPIO 420, 422, 424 can exceed the number of connections used for the corresponding communication link 410, 412, 414 and/or the number of physical GPIO pins available on an integrated circuit device for external connections.

The term GPIO pin or GPIO terminal may be used herein to refer to generic pins, connectors, pads, and/or terminals that may be used to interconnect circuits and/or devices. GPIO pins and GPIO connections may be customized for particular applications. For example, a GPIO pin may be programmable to function as an output pin, an input pin or a bidirectional pin, in accordance with application needs. In one example, the Application Processor 402 may assign and/or configure a number of GPIO pins to conduct handshake signaling or inter-processor communication (IPC) with a peripheral device 404, 406, 408 such as a modem. When handshake signaling is used, sideband signaling may be symmetric, where signaling is transmitted and received by the Application Processor 402 and a peripheral device 404, 406, 408. With increased device complexity, the increased number of GPIO pins used for IPC communication may significantly increase manufacturing cost and limit GPIO availability for other system-level peripheral interfaces.

According to certain aspects, the state of GPIO, including GPIO associated with a communication link, may be captured, serialized and transmitted over a data communication link In one example, captured GPIO may be transmitted in packets over an I3C bus, RFFE bus, SPMI bus or other bus, using a command and control protocol to indicate packet content and/or destination.

Figure 5:
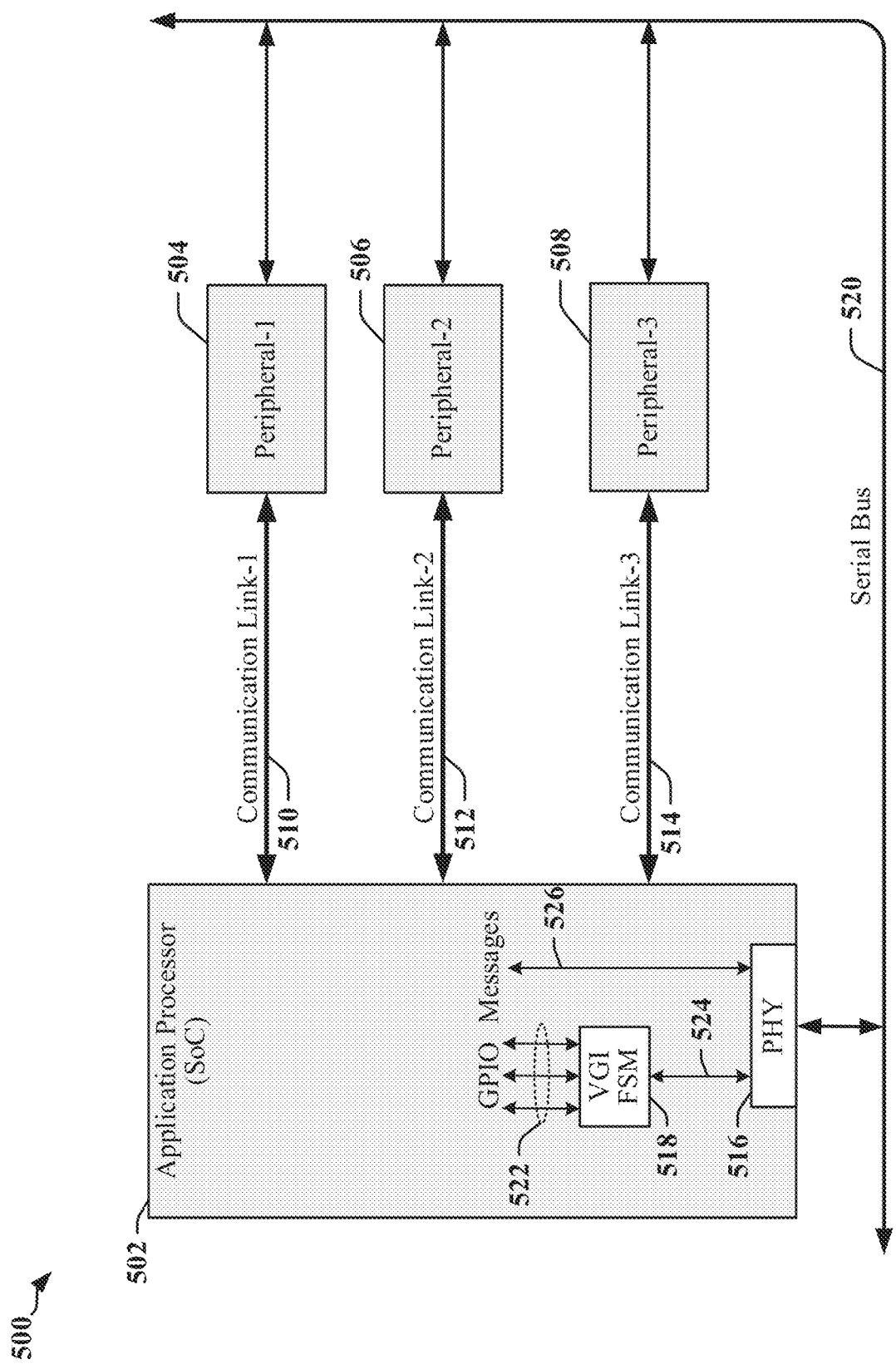
FIG. 5 illustrates a first example of an apparatus that has been adapted to support Virtual GPIO (VGI) in accordance with certain aspects disclosed herein.

FIG. 5 illustrates an apparatus 500 that has been adapted to support a virtual GPIO interface (VGI) in accordance with certain aspects disclosed herein. The VGI enables the state of a plurality of GPIO signals 522 to be represented by bits of virtual GPIO state that can be serialized and transmitted over a communication link. Each GPIO signal 522 may represent signaling state of one or more physical GPIO pins. The use of the VGI messaging techniques disclosed herein can reduce the number of physical pins and connections used to connect an Application Processor 502 with one or more peripheral devices 504, 506, 508. In some examples, the Application Processor 502 is implemented in an SoC or other integrated circuit, while peripheral devices 504, 506, 508 may be collocated with the Application Processor 502 and/or implemented in one or more other SoCs or integrated circuit devices. In one example, an integrated circuit may include multiple modems that share RF transceivers provided in the integrated circuit. The peripheral devices 504, 506, 508 may communicate with the Application Processor 502 over a common shared bus or over individual, distinct communication links 510, 512, 514.

In the illustrated apparatus 500, the communication links 510, 512, 514 may correspond to the communication links 410, 412, 414 illustrated in FIG. 4, with physical GPIO 522 (e.g., the sideband GPIO 420, 422, 424) being virtualized in VGI messages that are encoded in packets by a finite state machine (FSM 518) for transmission over a serial bus 520. Physical layer circuits and modules (PHY 516) responsible for transmitting packets over the serial bus 520 may combine and prioritize packetized application messages 526 and packetized VGI messages 524 for transmission over the serial bus 520. In some implementations, the FSM 518 may combine and prioritize the packetized application messages 526 and packetized VGI messages 524.

Figure 6:
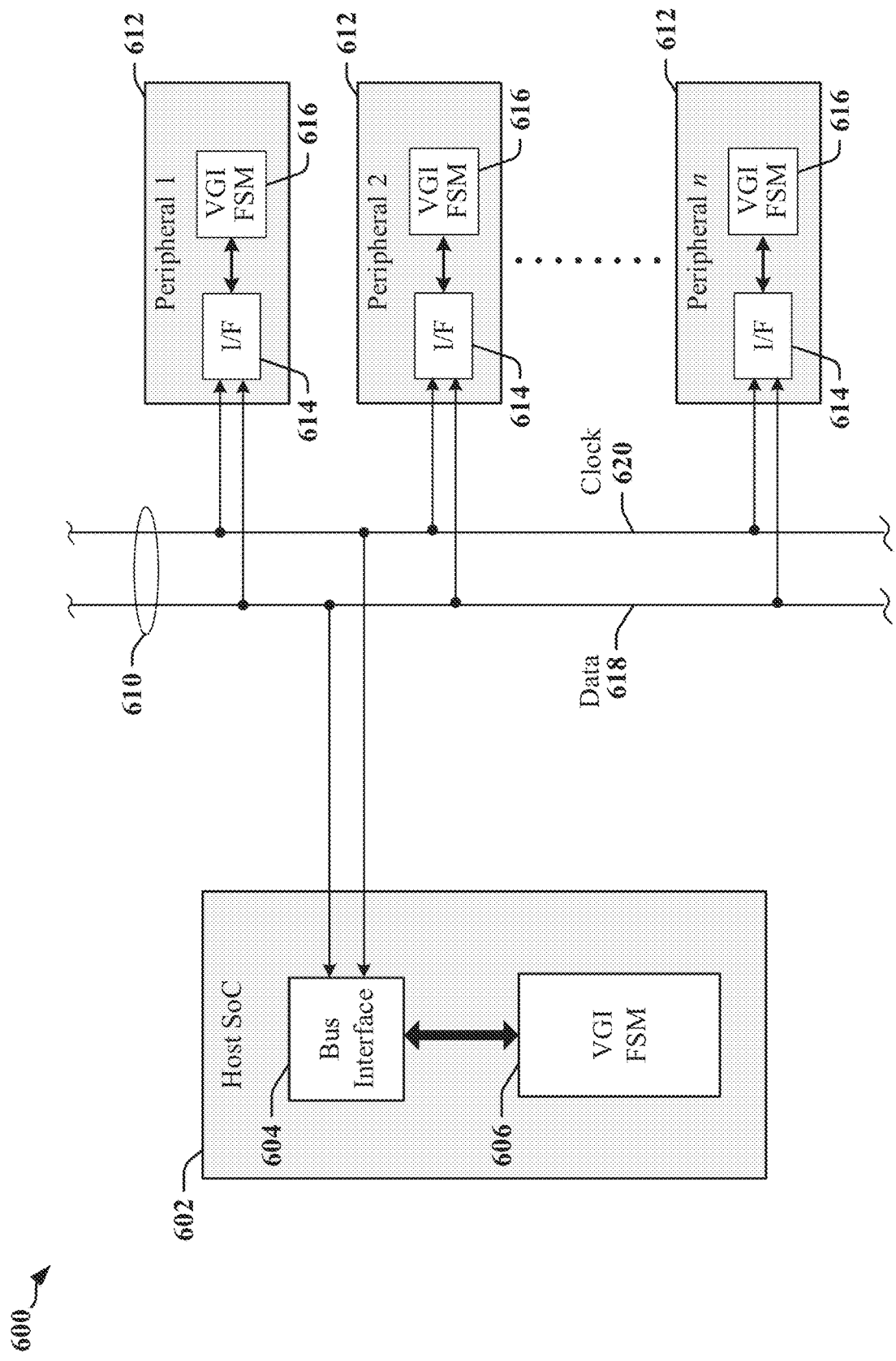
FIG. 6 illustrates a device that employs an I3C bus to couple various front-end devices in accordance with certain aspects disclosed herein.

FIG. 6 illustrates a configuration of a system 600 that enables the exchange of VGI messages between various devices over a serial bus 610 that has a data line 618 and a clock line 620. The system 600 includes a host SoC 602 and a number of peripheral devices 612. It will be appreciated that certain concepts disclosed herein apply equally to communication links operated in accordance with other protocols, such as I2C, I3C, RFFE and SPMI protocols. The host SoC 602 may include a VGI finite state machine (VGI FSM 606) and a bus interface 604. The bus interface 604 cooperates with corresponding bus interfaces 614 in the peripheral devices 612 in accordance with a bus protocol to provide a communication link between the host SoC 602 and the peripheral devices 612. Each peripheral device 612 includes a VGI FSM 616. In some examples, the host SoC 602 may include a configurable interface that may be employed to communicate using some combination of I2C, I3C, RFFE and/or another suitable protocol.

Figure 7:
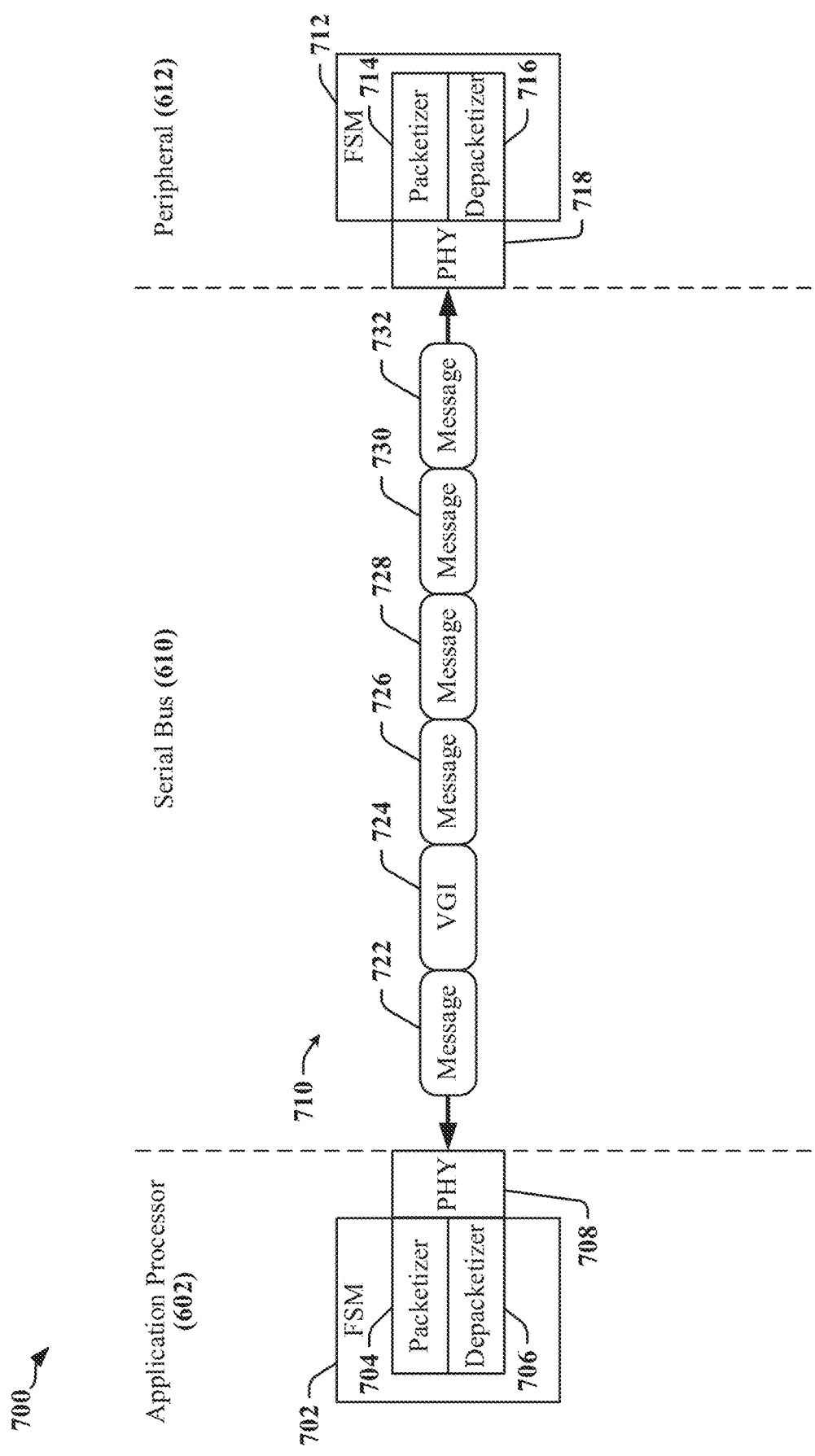
FIG. 7 illustrates a system in which VGI is transmitted in a packet stream in accordance with certain aspects disclosed herein.

FIG. 7 illustrates a system 700 in which a VGI message is packetized in one or more VGI packets 724 and transmitted in a packet stream 710 that includes application packets 722, 726, 728, 730, 732 that carry messages associated with one or more applications supported by the host SoC 602. The packets 722, 724, 726, 728, 730, 732 in the packet stream 710 may be exchanged over the serial bus 610 and between the host SoC 602 and at least one peripheral device 612.

A finite state machine 702 in the host SoC 602 may include a packetizer 704 configured to generate VGI packets 724 that are transmitted through a physical layer interface, the PHY 708. In some examples, the finite state machine 702 may prioritize VGI packets 724 over one or more of the application packets 722, 726, 728, 730, 732 that are to be transmitted over the serial bus 610. The finite state machine 702 may insert the VGI packets 724 into a stream of application packets 722, 726, 728, 730, 732 for transmission over the serial bus 610. The finite state machine 702 may receive one or more of the packets 722, 724, 726, 728, 730, 732 through the PHY 708. The finite state machine 702 may pass received application packets 722, 726, 728, 730 and/or 732 to other functions and/or circuits in the host SoC 602. The finite state machine 702 may include a depacketizer 706 that decodes virtualized GPIO state information in received VGI packets 724 and may drive physical signals and/or physical GPIO pins in accordance with the GPIO state information.

A finite state machine 712 in the peripheral device 612 may include a packetizer 714 configured to generate VGI packets 724 that are to be transmitted by the PHY 718. In some examples, the finite state machine 712 may prioritize VGI packets 724 for transmission on the serial bus 610. The finite state machine 712 may insert the VGI packets 724 into a stream of application packets 722, 726, 728, 730, 732. The finite state machine 712 may receive one or more of the packets 722, 724, 726, 728, 730, 732 through the PHY 718. The finite state machine 712 may pass received application packets 722, 726, 728, 730, 732 to other functions and/or circuits in the peripheral device 612. The finite state machine 712 may include a depacketizer 716 that decodes virtualized GPIO state information in received VGI packets 724 and may drive physical signals and/or physical GPIO pins in accordance with the GPIO state information.

The exchange of VGI packets 724 enables a physical GPIO pin in the host SoC 602 to track and replicate the signaling state of a corresponding physical GPIO pin in the peripheral device 612, and enables a physical GPIO pin in the peripheral device 612 to track and replicate the signaling state of a corresponding physical GPIO pin in the host SoC 602.

Figure 8:
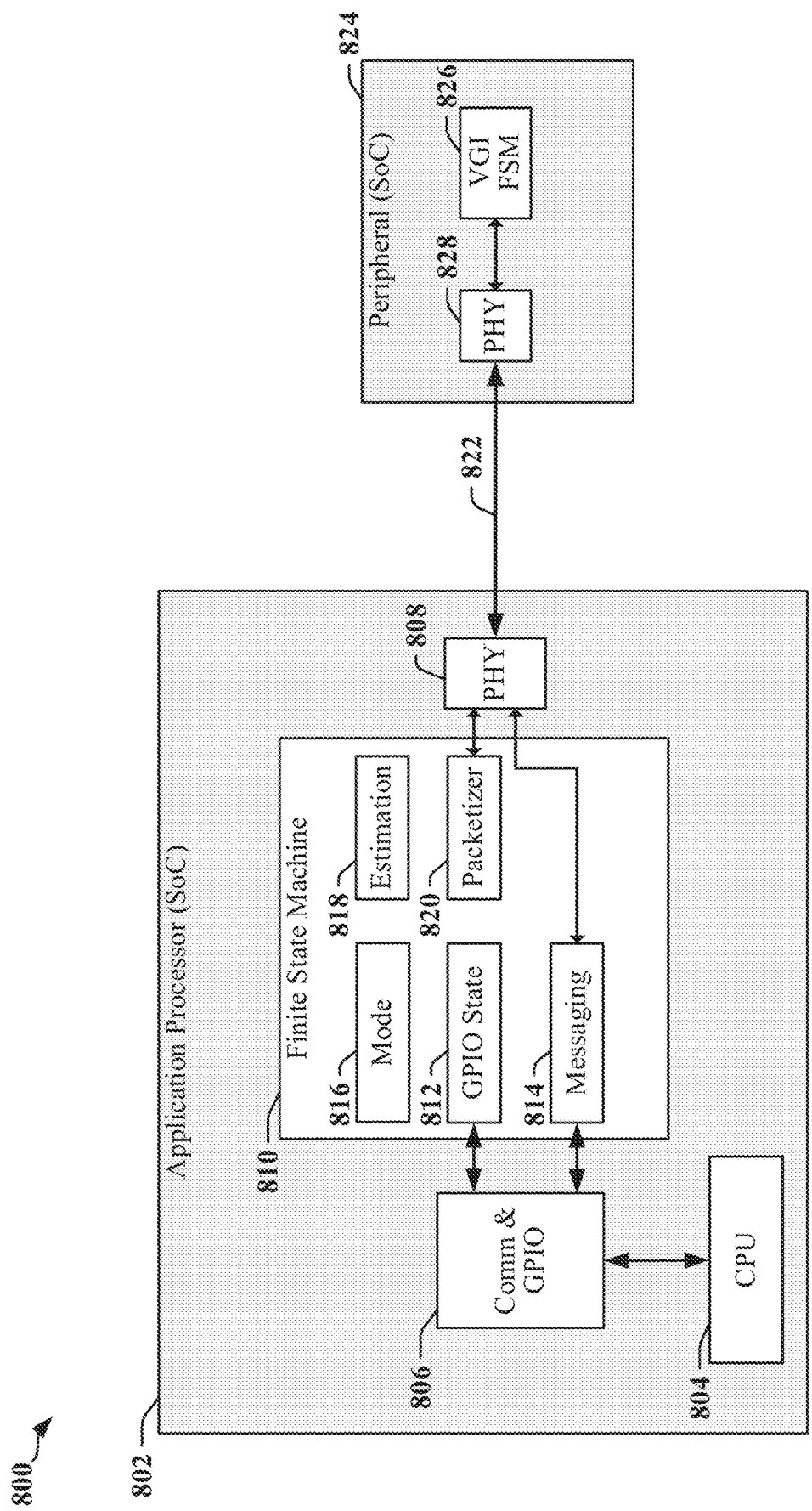
FIG. 8 illustrates a second example of an apparatus that has been adapted to support Virtual GPIO in accordance with certain aspects disclosed herein.

FIG. 8 illustrates an apparatus 800 that is adapted to support the exchange of VGI messages between an Application Processor 802 and a peripheral device 824 in accordance with certain aspects disclosed herein. The signaling state of physical GPIO, changes in signaling state of physical GPIO, and/or signals transmitted through physical GPIO can be represented in bits of virtual GPIO information that can be provided in VGI messages, serialized, and transmitted over a communication link 822. The signaling state of physical GPIO may represent a voltage level observed or expected at a physical GPIO pin. In some implementations, signals transmitted through pins, traces, connectors wires, etc. (GPIO signals), may be represented as a time sequence of virtual state information transmitted in VGI messages. For example, virtual state information for a GPIO pin may be represented by a binary bit where a bit value of '0' represents a '0' level or logic state, and a bit value of '1' represents a '1' level or logic state. In some implementations, signals transmitted through pins, traces, connectors wires, etc. (GPIO signals), may be communicated as a sequence of virtual state changes and transmitted in VGI messages. In one example, state changes may be represented by a binary bit where a bit value of '0' a positive transition or change in state from a '0' level to a '1' level, and a bit value of '1' represents a negative transition or change in state from a '1' level to a '0' level. In another example, state changes may be represented by a binary bit where a bit value of '0' represents no change of level or logic state, and a bit value of '1' represents a change of change of level or logic state. Other examples and assignments of values may be implemented as desired, and the number of bits used to represent GPIO state or change of state may vary with application.

In some instances, VGI messages are transmitted after a change in physical GPIO state has occurred. In one example, VGI messages may be encoded in packets that are transmitted over a communication link 822 that is implemented using a serial bus. When the communication link 822 is implemented using a serial bus, the receiving peripheral device 824 may deserialize received packets and may extract VGI messages and, in some instances, application messages from the received packets. A VGI FSM 826 in the peripheral device 824 may convert the VGI messages to physical GPIO state, change in state and/or signals that can be presented at an internal GPIO interface.

In another example, the communication link 822 may be a provided by a radio frequency transceiver that supports wireless communication using, for example, a Bluetooth protocol, a wireless local area network (WLAN) protocol, a cellular wide area network, and/or another wireless communication protocol. When the communication link 822 includes a wireless connection, application messages and VGI messages may be encoded in packets, frames, subframes, or other structures that can be transmitted over the communication link 822, and the receiving peripheral device 824 may extract, deserialize and otherwise process received signaling to obtain the application messages and VGI messages. Upon receipt of application messages and/or VGI messages, the VGI FSM 826 or another component of the receiving device may interrupt its host processor to indicate receipt of application messages, GPIO state and/or any changes in GPIO state.

In an example in which the communication link 822 is provided as a serial bus, messages and/or VGI messages may be transmitted in packets configured for an I2C, I3C, RFFE or another standardized serial interface. In the illustrated example, VGI messages may be exchanged to accommodate I/O bridging between an Application Processor 802 and a peripheral device 824. The Application Processor 802 may be implemented as an ASIC, SoC or some combination of devices. The Application Processor 802 includes a processor (central processing unit or CPU 804) that generates messages and GPIO associated with one or more communications channels 806. GPIO messages and application messages transmitted over the communications channels 806 may be monitored by respective monitoring circuits 812, 814 in a VGI FSM 826. In some examples, a GPIO monitoring circuit 812 or other circuit may be adapted to produce VGI messages representative of the state of physical GPIO signals. In some examples, the GPIO monitoring circuit 812 or other circuit may be adapted to produce application messages and/or VGI messages responsive to changes in the state of the physical GPIO signals.

An estimation circuit 818 may be configured to estimate latency information for the GPIO signals and application messages, and may select a protocol, and/or a mode of communication for the communication link 822 that optimizes the latency for encoding and transmitting VGI messages and application messages. The estimation circuit 818 may maintain protocol and mode information 816 that characterizes certain aspects of the communication link 822 to be considered when selecting the protocol, and/or a mode of communication. The estimation circuit 818 may be further configured to select a packet type for encoding and transmitting the VGI messages and application messages. The estimation circuit 818 may provide configuration information used by a packetizer 820 to encode the VGI messages and application messages. In one example, the configuration information is provided as a command that may be encapsulated in a packet such that the type of packet can be determined at a receiver. The configuration information, which may be a command, may also be provided to physical layer circuits (PHY 808). The PHY 808 may use the configuration information to select a protocol and/or mode of communication for transmitting the associated packet. The PHY 808 may then generate the appropriate signaling to transmit the packet.

The peripheral device 824 may include a VGI FSM 826 that may be configured to process data packets received from the communication link 822. The VGI FSM 826 at the peripheral device 824 may extract messages and may map bit positions in VGI messages onto physical GPIO pins in the peripheral device 824. In certain embodiments, the communication link 822 is bidirectional, and both the Application Processor 802 and a peripheral device 824 may operate as both transmitter and receiver.

VGI messages and application messages may be encapsulated into packets transmitted over the communication link 822, which may be a multi-wire serial bus or multi-wire parallel bus for example. The PHY 808 in the Application Processor 802 and a corresponding PHY 828 in the peripheral device 824 may be configured to establish and operate the communication link 822. The PHY 808 and 828 may be coupled to, or include a wireless transceiver 108 (see FIG. 1) that supports wireless communications. In some examples, the PHY 808 and 828 may support a two-wire interface such as an I2C, I3C, RFFE, SPMI or other interface at the Application Processor 802 and peripheral device 824, respectively.

VGI tunneling, as disclosed herein, can be implemented using existing or available protocols configured for operating the communication link 822, and without the full complement of physical GPIO pins. VGI FSMs 810, 826 may handle GPIO signaling without the intervention of a processor in the Application Processor 802 and/or in the peripheral device 824. The use of VGI tunneling can reduce pin count, power consumption, and latency associated with the communication link 822.

At the receiving device VGI messages are converted into physical GPIO signals. Certain characteristics of the physical GPIO pins may be configured using the VGI messages. For example, slew rate, polarity, drive strength, and other related parameters and attributes of the physical GPIO pins may be configured using the VGI messages. Configuration parameters used to configure the physical GPIO pins may be stored in configuration registers associated with corresponding GPIO pins. These configuration parameters can be addressed using a proprietary or conventional protocol such as I2C, I3C or RFFE. In one example, configuration parameters may be maintained in I3C addressable registers. Certain aspects disclosed herein relate to reducing latencies associated with the transmission of configuration parameters and corresponding addresses (e.g., addresses of registers used to store configuration parameters).

A communication interface adapted to communicate VGI messages in packets and/or as a sequence of transactions over an I2C, I3C, RFFE or SPMI bus may be referred to herein as a VGI messaging interface or VGMI. The presence of a VGI message in a transaction, packet or frame may be signaled using a special command code to identify the frame as a VGI frame. In some implementations, a serial data stream may be transmitted in a form that resembles a universal asynchronous receiver/transmitter (UART) signaling and messaging protocol, in what may be referred to herein as UART_VGI mode of operation.

Figure 9:
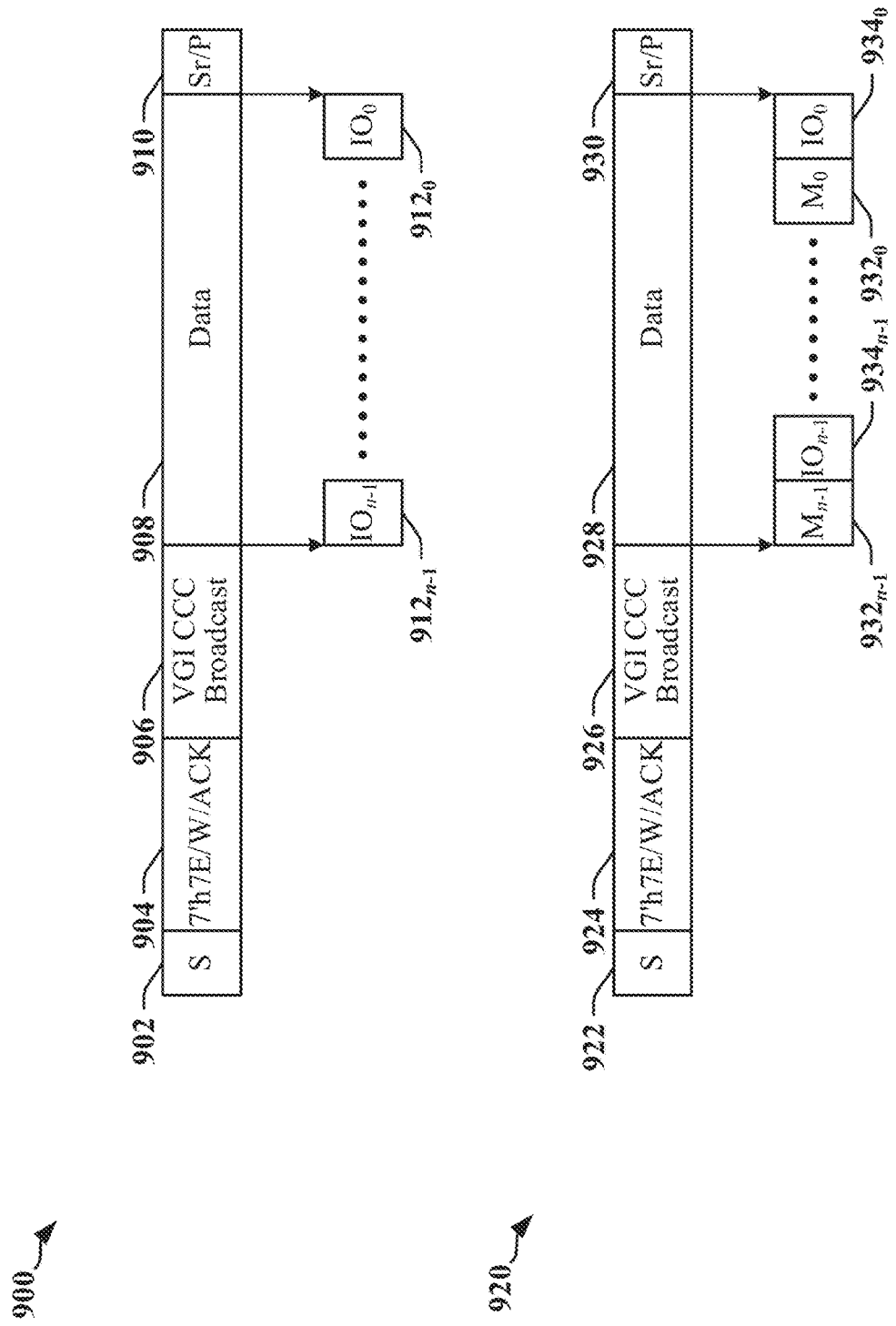
FIG. 9 illustrates examples of VGI broadcast frames according to certain aspects disclosed herein.

FIG. 9 illustrates examples of VGI broadcast frames 900, 920. In a first example, a VGI broadcast frame 900 commences with a start bit 902 (S) followed by a header 904 in accordance with an I2C or I3C protocol. A VGI broadcast frame may be identified using a VGI broadcast common command code 906. A VGI data payload 908 includes a number (n) of VGI messages $912_0$-$912_{n-1}$, ranging from a first VGI message $912_0$ to an nth VGI message $912_{n-1}$. A VGI FSM may include a mapping table that maps bit positions of VGI messages in a VGI data payload 908 to physical GPIO pins. The virtual nature of the signaling in the VGI data payload 908 can be transparent to processors in the transmitting and receiving devices.

In the second example, a masked VGI broadcast frame 920 may be transmitted by a host device to write the state of one or more GPIO pins without disturbing the state of other GPIO pins. In this example, the I/O signals for one or more devices are masked, while the I/O signals in a targeted device are unmasked. The masked VGI broadcast frame 920 commences with a start bit 922 followed by a header 924. A masked VGI broadcast frame 920 may be identified using a masked VGI broadcast common command code 926. The VGI data payload 928 may include I/O signal values $934_0$-$934_{n-1}$ and corresponding mask bits $932_0$-$932_{n-1}$, ranging from a first mask bit $M_0$ $932_0$ for the first I/O signal ($IO_0$) to an nth mask bit $M_{n-1}$ $932_{n-1}$ for the nth I/O signal $IO_{n-1}$.

A stop bit or synchronization bit (Sr/P 910, 930) terminates the VGI broadcast frame 900, 920. A synchronization bit may be transmitted to indicate that an additional VGI payload is to be transmitted. In one example, the synchronization bit may be a repeated START bit in an I2C interface.

Figure 10:
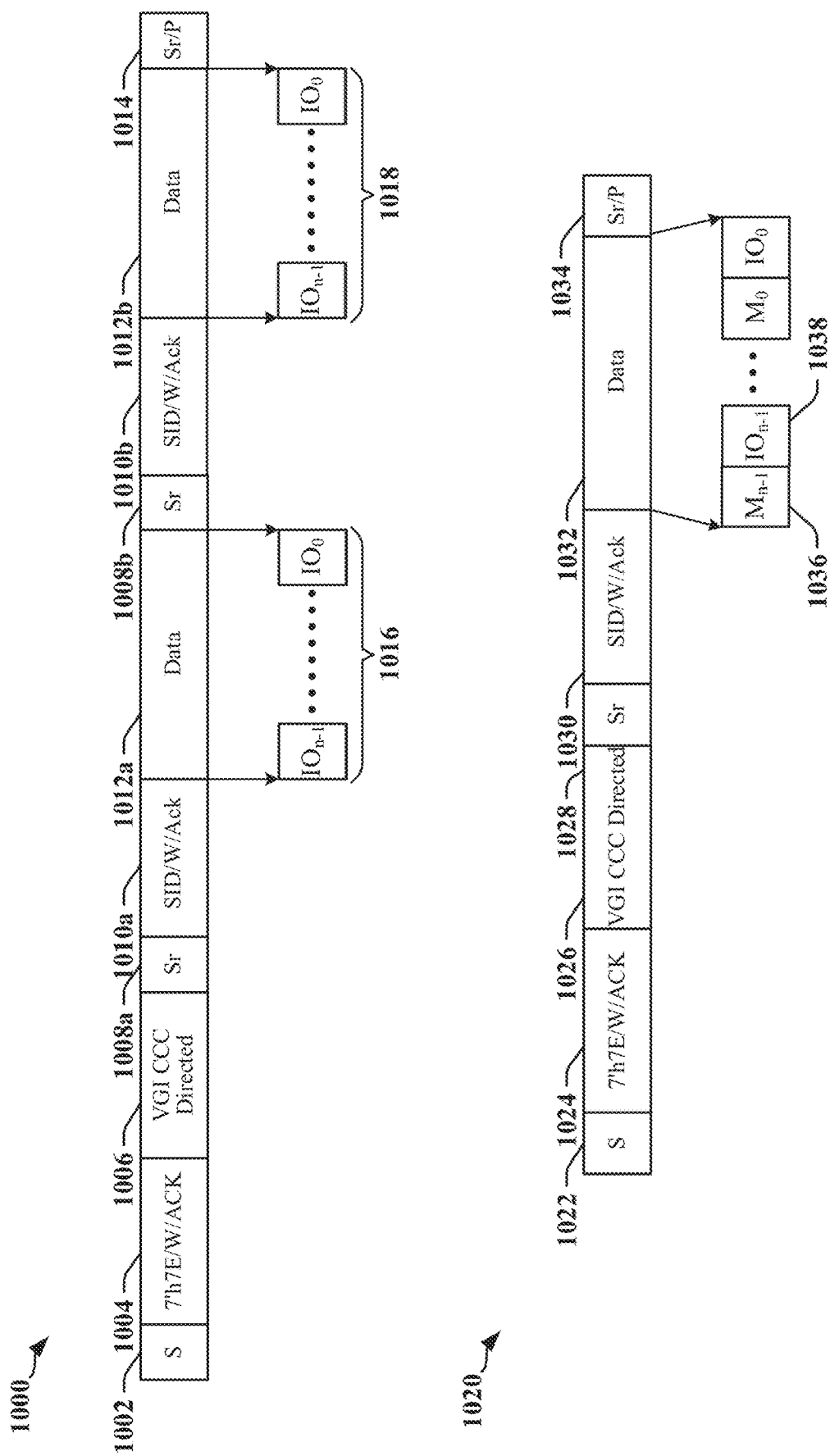
FIG. 10 illustrates examples of VGI directed frames according to certain aspects disclosed herein.

FIG. 10 illustrates examples of VGI directed frames 1000, 1020. In a first example, VGI directed frames 1000 may be addressed to a single peripheral device or, in some instances, to a group of peripheral devices. The first of the VGI directed frames 1000 commences with a start bit 1002 (S) followed by a header 1004 in accordance with an I2C or I3C protocol. A VGI directed frame 1000 may be identified using a VGI directed common command code 1006. The directed common command code 1006 may be followed by a synchronization field 1008*a* (Sr) and an address field 1010*a* that includes a slave identifier to select the addressed device. The directed VGI data payload 1012*a* that follows the address field 1010*a* includes values 1016 for a set of I/O signals that pertain to the addressed device. VGI directed frames 1000 can include additional directed VGI data payloads 1012*b* for additional devices. For example, the first directed VGI data payload 1012*a* may be followed by a synchronization field 1008*b* and a second address field 1010*b*. In this example, the second directed VGI data payload 1012*b* includes values 1018 for a set of I/O signals that pertain to a second addressed device. The use of VGI directed frames 1000 may permit transmission of values for a subset or portion of the I/O signals carried in a VGI broadcast frame 900, 920.

In the second example, a masked VGI directed frame 1020 may be transmitted by a host device to write the state of one or more GPIO pins without disturbing the state of other GPIO pins in a single peripheral device and without affecting other peripheral devices. In some examples, the I/O signals in one or more devices may be masked, while selected I/O signals in one or more targeted device are unmasked. The masked VGI directed frame 1020 commences with a start bit 1022 followed by a header 1024. A masked VGI directed frame 1020 may be identified using a masked VGI directed command code 1026. The masked VGI directed command code 1026 may be followed by a synchronization field 1028 (Sr) and an address field 1030 that includes a slave identifier to select the addressed device. The directed payload 1032 that follows includes VGI values for a set of I/O signals that pertain to the addressed device. For example, the VGI values in the directed payload 1032 may include I/O signal values 1038 and corresponding mask bits 1036.

A stop bit or synchronization bit (Sr/P 1014, 1034) terminates the VGI directed frames 1000, 1020. A synchronization bit may be transmitted to indicate that an additional VGI payload is to be transmitted. In one example, the synchronization bit may be a repeated START bit in an I2C interface.

Figure 11:
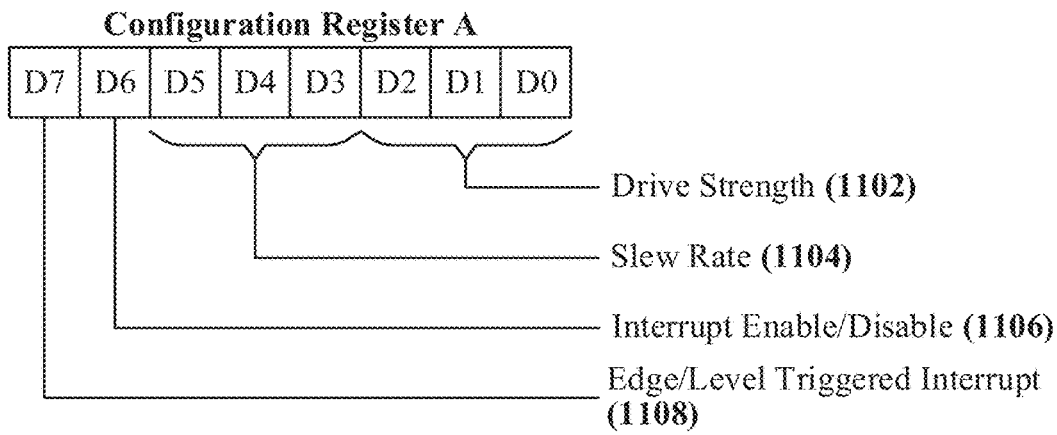
FIG. 11 illustrates configuration registers that may be associated with a physical pin according to certain aspects disclosed herein.
Figure 11:
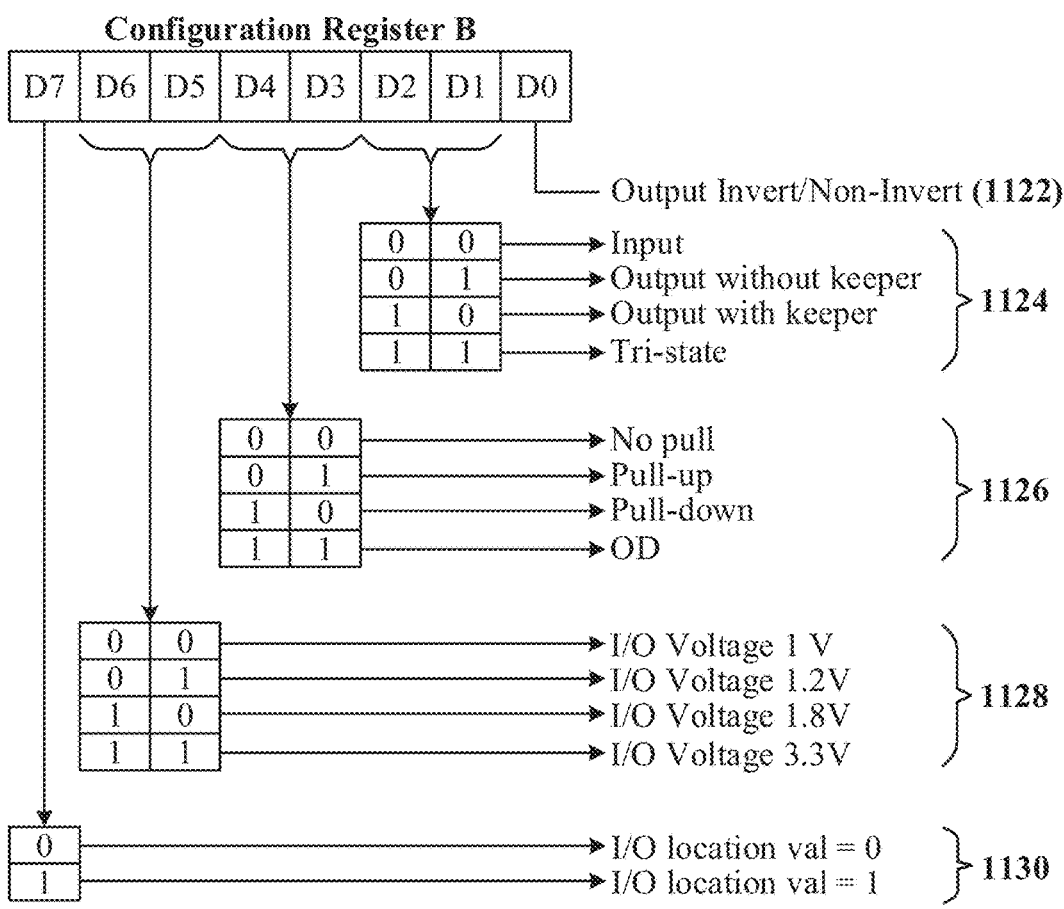

At the receiving device (e.g., the Application Processor 502 and/or peripheral device 504, 506, 508), received VGI messages are expanded into physical GPIO signal states presented on GPIO pins. The term "pin," as used herein, may refer to a physical structure such as a pad, pin or other interconnecting element used to couple an IC to a wire, trace, through-hole via, or other suitable physical connector provided on a circuit board, substrate or the like. Each GPIO pin may be associated with one or more configuration registers that store configuration parameters for the GPIO pin. FIG. 11 illustrates configuration registers 1100 and 1120 that may be associated with a physical pin. Each configuration register 1100, 1120 is implemented as a one-byte (8 bits) register, where different bits or groups of bits define a characteristic or other features that can be controlled through configuration. In a first example, bits D0-D2 1102 control the drive strength for the GPIO pin, bits D3-D5 1104 control the slew rate for GPIO pin, bit D6 1106 enables interrupts, and bit D7 1108 determines whether interrupts are edge-triggered or triggered by voltage-level. In a second example, bit D0 1122 selects whether the GPIO pin receives an inverted or non-inverted signal, bits D1-D2 1124 define a type of input or output pin, bits D3-D4 1126 defines certain characteristics of an undriven pin, bits D5-D6 1128 define voltage levels for signaling states, and bit D7 1130 controls the binary value for the GPIO pin (i.e., whether GPIO pin carries carry a binary one or zero).

Heterogeneous VGI

In an interface that employs VGI messages to exchange GPIO state information between devices, a physical GPIO pin in a first device can track and replicate the signaling state of a corresponding physical GPIO pin in a second device, and vice versa. The VGI messages may be exchanged over a serial bus or other communication link that carries other traffic, including application messages transmitted between devices and/or applications. The application messages may include payload data generated by sensors and/or information related to or resulting from processing by an application. The application messages may also include management and control messages, including events generated by applications, device drivers and other software. The events may include software interrupts, traps, changes in status of flags or semaphores and other inter-process messages. Management and control messages may be transmitted in high-priority application packets, and a VGI finite state machine may be configured to arbitrate between high-priority application packets and VGI packets.

According to certain aspects disclosed herein, software events may be handled by a finite state machine that is adapted to generate VGI packets representative of physical GPIO state information. The software events may be represented in the same manner that physical GPIO is represented, including when physical GPIO represents signaling states associated with hardware events. In some implementations, software events may be converted to physical signals that can be handled by the VGI finite state machine with little or no adaptation of the VGI finite state machine. In some implementations, the software events may be converted to bit settings in registers configured to handle virtualized GPIO (see configuration registers 1100 and 1120 of FIG. 11).

Figure 12:
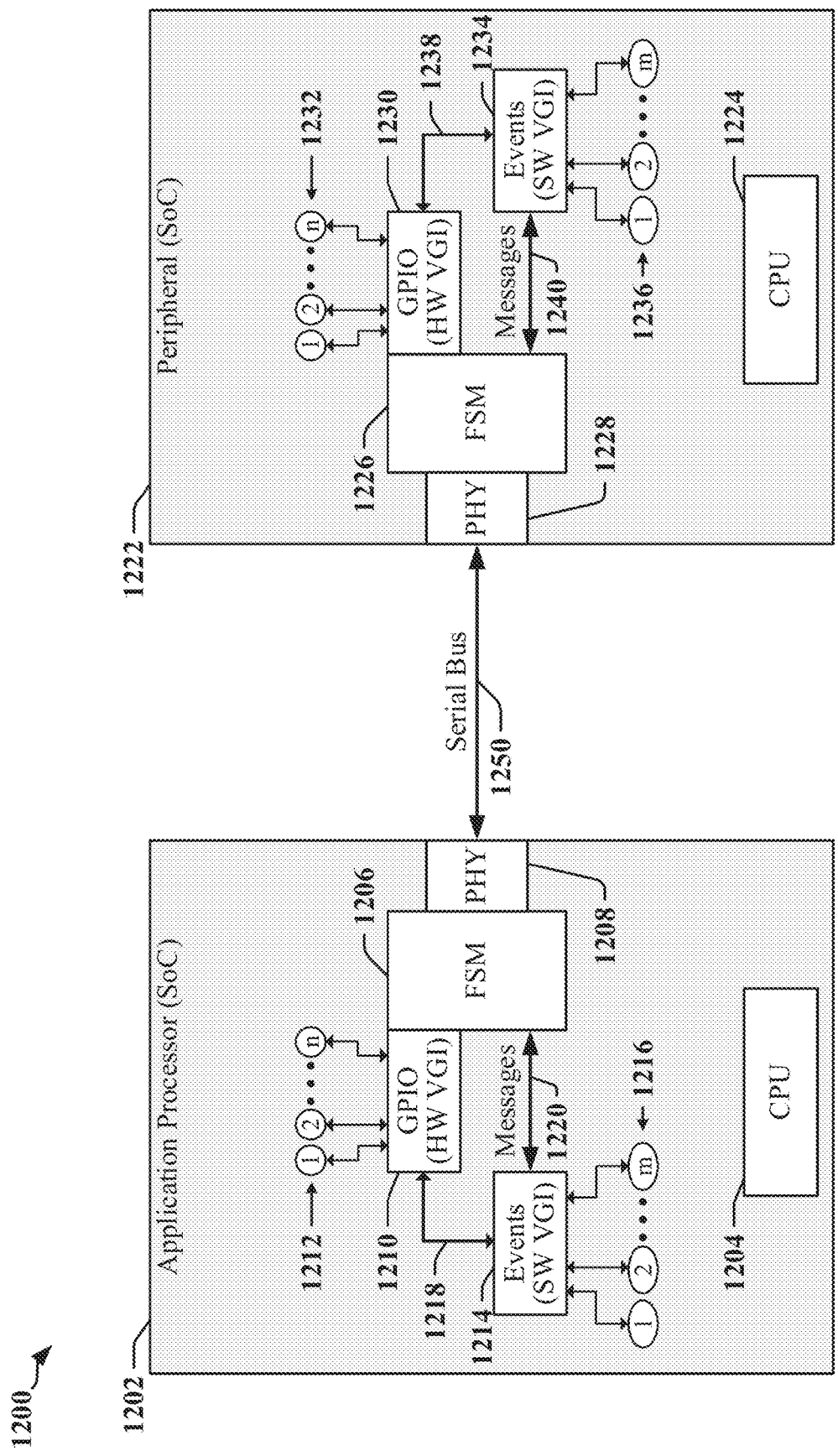
FIG. 12 illustrates an apparatus that is adapted to represent hardware and software events as VGI in accordance with certain aspects disclosed herein.

FIG. 12 illustrates an apparatus 1200 that is adapted to represent hardware and software events as virtual GPIO in accordance with certain aspects disclosed herein. Hardware events may be generated by changes in state of physical GPIO, while software events may be generated by applications and/or operating systems and communicated in a message, in a memory or register value and/or as a call to a function monitored by the operating system or an application.

In the illustrated apparatus 1200, an Application Processor 1202 includes a central processing unit (CPU 1204), finite state machine 1206 and PHY 1208. The PHY 1208 may handle transmission of packets that carry VGI messages over a serial bus 1250. The VGI messages are provided to the PHY 1208 by the finite state machine 1206. The finite state machine 1206 may be adapted to include hardware and software event handlers 1210, 1214. The GPIO handler 1210 may monitor physical GPIO 1212 as sources of hardware events. The physical GPIO 1212 may be virtualized as disclosed herein. In some instances, the GPIO handler 1210 may include information in the VGI messages that explicitly identifies included state information as being related to physical GPIO.

The software event handler 1214 may receive software event messages directly from one or more software event sources 1216. In some instances, the software event handler 1214 may receive or monitor a packet stream that includes other types of message. The software event handler 1214 may identify software events based on direct notification by an application, and/or by monitoring certain operations of the Application Processor 1202. In one example, an application that generates an event writes a register monitored by the software event handler 1214. The software event handler 1214 may provide and monitor physical signals 1218 that represent software events, and may translate between the physical signals 1218 and the software event sources 1216. The finite state machine 1206 may generate VGI messages to be transmitted to the peripheral device 1222. In some implementations, the software handler 1214 may encode software events in VGI messages 1220 provided to the finite state machine 1206. The software handler 1214 may include information in the VGI messages 1220 that identifies software events in the in the VGI messages 1220.

The finite state machine 1206 may also receive VGI messages from a peripheral device 1222 through the PHY 1208. The peripheral device 1222 may include a central processing unit (CPU 1224), finite state machine 1226 and PHY 1228. The PHY 1228 may handle transmission of packets that carry VGI messages over the serial bus 1250. The VGI messages are provided to the PHY 1228 by the finite state machine 1226. The finite state machine 1226 may be adapted to include hardware and software event handlers 1230, 1234. The GPIO handler 1230 may monitor physical GPIO 1232 as sources of hardware events. The physical GPIO 1232 may be virtualized as disclosed herein. In some instances, the GPIO handler 1230 may include information in the VGI messages that explicitly identifies included state information as being related to physical GPIO.

The software event handler 1234 may receive software event messages directly from one or more software event sources 1236. In some instances, the software event handler 1234 may receive or monitor a packet stream that includes other types of message. The software event handler 1234 may identify software events based on direct notification by an application, and/or by monitoring certain operations of the peripheral device 1222. In one example, an application that generates an event writes a register monitored by the software event handler 1234. The software handler 1234 may provide and monitor physical signals 1238 that represent software events, and may translate between the physical signals 1238 and the software event sources 1236. The finite state machine 1226 may generate VGI messages to be transmitted by the finite state machine 1226. In some implementations, the software handler 1234 may encode software events in VGI messages 1240 provided to the finite state machine 1226. The software handler 1234 may include information in the VGI messages 1240 that identifies software events in the in the VGI messages 1240.

In one example, the finite state machines 1206, 1226 may distinguish between VGI messages that relate to software events and VGI messages that relate to physical GPIO based on identifying information provided in the VGI messages. In another example, the finite state machines 1206, 1226 may direct VGI messages to a handler 1210, 1214, 1230 or 1234 identified in the VGI messages. In the latter example, the interface between the finite state machine 1206, 1226 and corresponding handlers 1210, 1214, 1230, 1234 can be abstracted such that the finite state machines 1206, 1226 need not be aware of the type of function of the handlers 1210, 1214, 1230, 1234. In either example, a VGI interface may be configured to support conversion between physical GPIO on a first device and software events on a second device, and vice versa.

Figure 13:
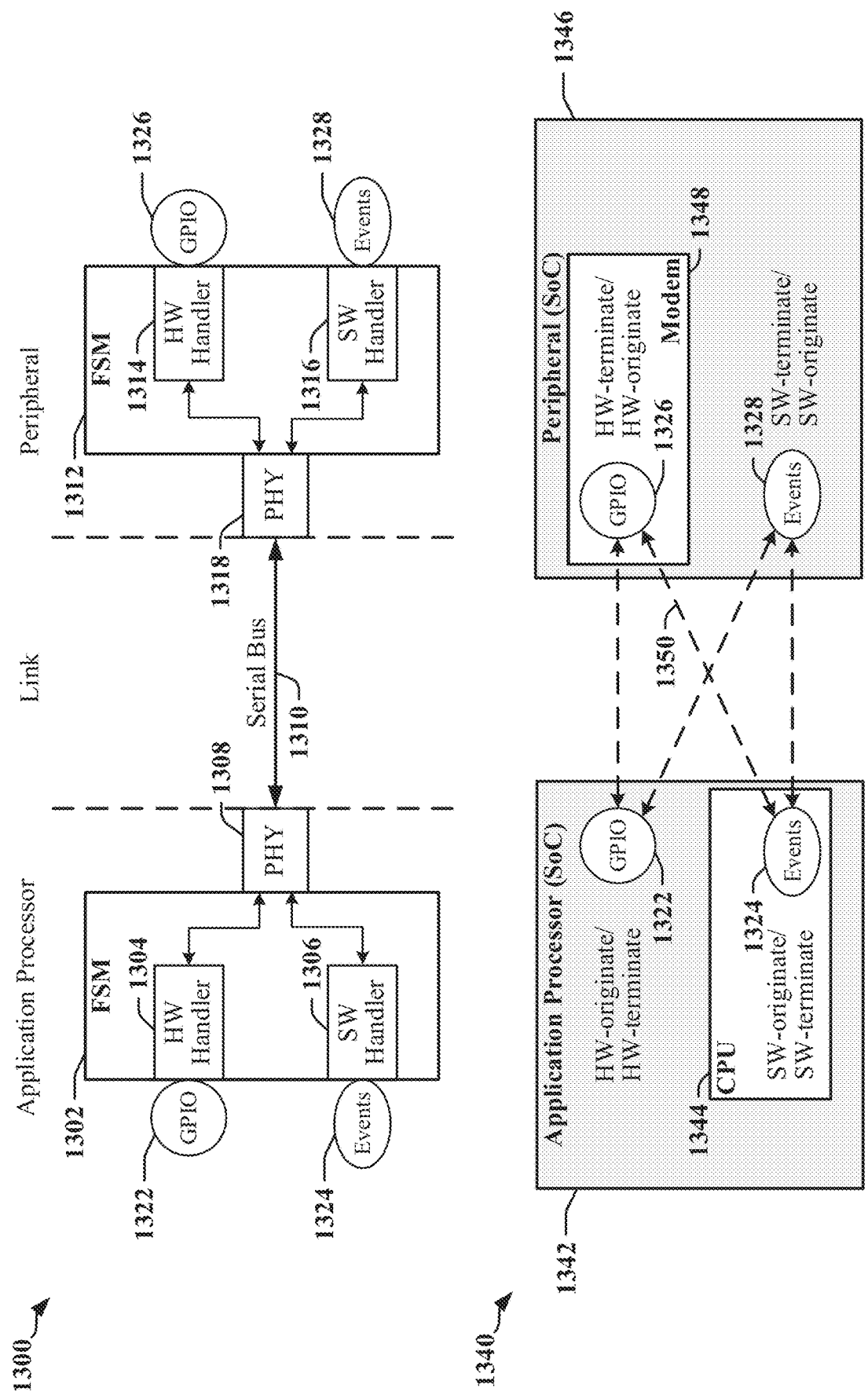
FIG. 13 illustrates certain aspects of message flow in the apparatus illustrated in FIG. 12.

FIG. 13 includes a simplified representation 1300 of the apparatus 1200 in FIG. 12 and a crossbar mapping 1340 that represents message flow in a VGI interface adapted in accordance with certain aspects disclosed herein. The FSM 1302 in a first device includes a first handler 1304 that manages communication of state of physical GPIO 1322, and a second handler 1306 that manages communication of software events 1324. The FSM 1312 in a second device includes a third handler 1314 that manages communication of state of physical GPIO 1326, and a fourth handler 1316 that manages communication of software events 1328. VGI messages are transmitted over a serial bus 1310 through PHYs 1308, 1318.

Table 1 shows the permutations of VGI transfer between physical GPIO and software events and FIG. 13 includes a corresponding crossbar mapping 1340.

TABLE 1

|  |  | Destination | |
|---|---|---|---|
|  |  | Physical GPIO | Software Event |
| Source | Physical GPIO | All-Hardware VGI | Hardware-to-Software VGI |
|  | Software Event | Software-to-Hardware VGI | All-Software VGI |

The crossbar mapping 1340 may be applicable to the apparatus 1200 illustrated in FIG. 12, where VGI messages may represent the state of physical GPIO generated and/or monitored by hardware circuits, and events generated and/or consumed by software, and an Application Processor and a Peripheral can be sources and/or destinations for both types of VGI messages.

Certain VGI messages related to physical GPIO 1322 may originate in the first device and terminate in the second device. In one example, the state of a physical GPIO pin may be modified in the first device and a VGI message may be transmitted from the first device to the second device in order to update the state of a corresponding physical GPIO pin in the second device. In another example, the state of a physical GPIO pin may be modified in the first device and a VGI message may be transmitted from the first device to the second device in order to create a software event in the second device.

Certain VGI messages related to physical GPIO 1322 may originate in the second device and terminate in the first device. In one example, the state of a physical GPIO pin may be modified in the second device and a VGI message may be transmitted from the second device to the first device in order to update the state of a corresponding physical GPIO pin in the first device. In another example, the state of a physical GPIO pin may be modified in the second device and a VGI message may be transmitted from the second device to the first device in order to create a software event in the first device.

Certain VGI messages related to software events 1324 may originate in the first device and terminate in the second device. In one example, the occurrence of a software event in the first device may cause a VGI message to be transmitted from the first device to the second device in order to update the state of a physical GPIO pin in the second device. In another example, the occurrence of a software event in the first device may cause a VGI message to be transmitted from the first device to the second device in order to create a corresponding software event in the second device.

Certain VGI messages related to physical GPIO 1322 may originate in the second device and terminate in the first device. In one example, the occurrence of a software event in the second device may cause a VGI message to be transmitted from the second device to the first device in order to update the state of a physical GPIO pin in the first device. In another example, the occurrence of a software event in the second device may cause a VGI message to be transmitted from the second device to the first device in order to create a corresponding software event in the first device.

In one example, an Application Processor 1342 may include a CPU 1344 that manages and/or monitors a modem 1348 in a peripheral device 1346. The modem may generate signals that are transmitted through physical GPIO 1326. The CPU 1344 may be configured according to certain aspects disclosed herein to receive the modem-generated signals as software events 1324. The CPU 1344 may be further configured to aspects disclosed herein to generate software events 1324 relevant to the operation of the modem 1348, where the software events 1324 are converted to physical GPIO 1326 coupled to the modem 1348. Communication between the CPU 1344 and the modem 1348 is illustrated by a diagonal line 1350.

In one example, VGI messages that include state information related to hardware-generated signals such as hardware timers may be directed to physical GPIO that is coupled to circuits that respond to the signals generated by hardware timers. In another example, VGI messages that include state information related to certain hardware-generated events may be converted to a software event in a receiving VGI finite state machine. In the latter example, an application processor may support a limited number of hardware interrupts and it can be useful to convert hardware interrupts from some devices to software interrupts that can be more conveniently serviced by the application processor. In another example, VGI messages that include state information related to certain software-generated events may be converted to hardware GPIO states in a receiving VGI finite state machine. In the latter example, an application processor may generate a software event that is converted to a hardware interrupt at a peripheral device. In another example, VGI messages that include state information related to certain software-generated events may be handled a software events in a receiving VGI finite state machine.

Figure 14:
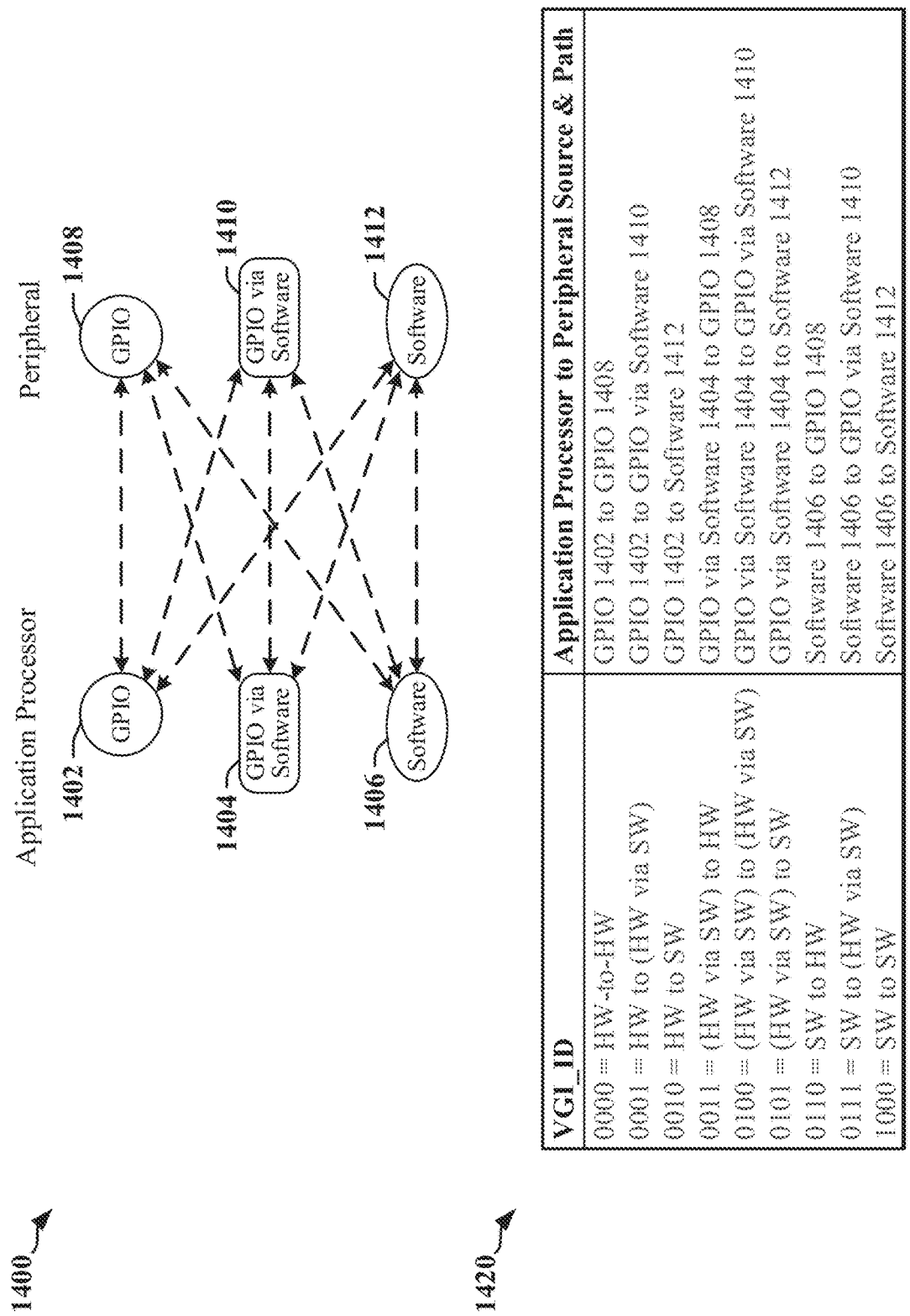
FIG. 14 illustrates an example of crossbar mapping for heterogeneous VGI in accordance with certain aspects disclosed herein.

FIG. 14 illustrates a crossbar mapping 1400 illustrating an expanded implementation of heterogeneous VGI. In many applications, one or more signals transmitted over physical GPIO is created and/or controlled by firmware and/or software. For example, an application may write a binary value to a register that outputs the value on one or more GPIO pins. According to certain aspects disclosed herein, the state of certain GPIO pins may be created and captured using a finite state machine 1206, 1226. In some instances, modules that generate signals transmitted through physical GPIO may be adapted to create VGI messages that represent the signals as a sequence of events corresponding to signaling state changes of the signals. The technique of directly generating VGI messages in place of a physical signal may be referred to herein as software-originated VGI.

Table 2 shows the permutations of VGI transfer corresponding to the crossbar mapping 1400.

TABLE 2

|        |             | Destination |                  |                   |
|--------|-------------|-------------|------------------|-------------------|
|        |             | HW GPIO     | HW via SW GPIO   | Software Event    |
| Source | HW GPIO     | X           | X                | X                 |
|        | HW via SW GPIO | X        | X                | X                 |
|        | SW Event    | X           | X                | X                 |

The crossbar mapping 1400 may be applicable to the apparatus 1200 illustrated in FIG. 12, where VGI messages may represent the state of physical GPIO 1402, 1408 generated and/or monitored by hardware circuits, GPIO 1404, 1410 generated and/or monitored by software and software events 1406, 1412 generated and/or consumed by software. An Application Processor and a Peripheral can be sources and/or destinations for both types of VGI messages. In this example, VGI messages generated from any source can be directed to the physical GPIO 1402, 1408, to GPIO 1404, 1410 that is monitored by software, or to handlers that create software events 1406, 1412.

Table 3 shows an example in which fewer than all permutations of VGI transfer provided in the crossbar mapping 1400.

TABLE 3

|        |             | Destination |                  |                   |
|--------|-------------|-------------|------------------|-------------------|
|        |             | HW GPIO     | HW via SW GPIO   | Software Event    |
| Source | HW GPIO     | X           |                  | X                 |
|        | HW via SW GPIO | X        | X                | X                 |
|        | SW Event    | X           |                  | X                 |

In Table 3, exchanges of VGI messages related to the state of hardware-generated GPIO or software events to hardware GPIO monitored by software is not supported.

Table 2 and the corresponding crossbar mapping 1400 provide up to 9 exchange options when software-originated physical GPIO is distinguished from hardware-originated GPIO and software events. Characteristics of sources and destinations of VGI messages may be identified in the VGI messages using a definition code (VGI_ID). The codes in the table 1420 illustrated in FIG. 14 provides one example of a coding scheme defining VGI_ID values that may be used to manage VGI messages in accordance with the crossbar mapping 1400. The VGI_ID values are expressed in four bits and encode mapping between sources and destinations. MIPI Alliance standards for I3C provide dedicated common command codes (CCCs) that are assigned for VGI messaging. When a receiver detects a VGI CCC, then it recognizes that the corresponding packet includes virtualized GPIO. In conventional systems, the virtualized GPIO is presumed to be representative of hardware generated signaling state of GPIO pins.

Figure 15:
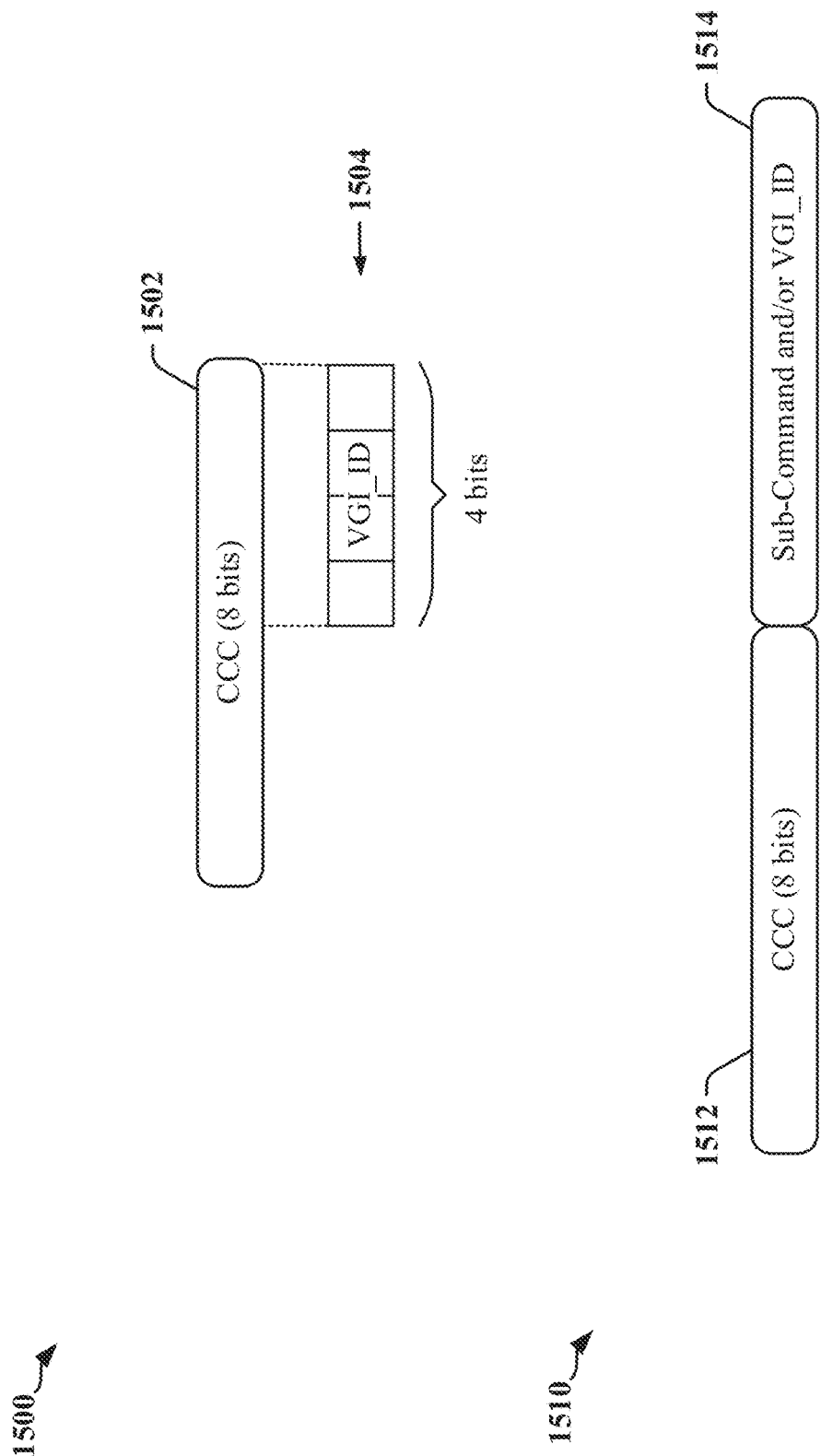
FIG. 15 illustrates adaptations of command codes that may be used to distinguish VGI messages related to hardware-generated GPIO from VGI messages related to software events and software-generated physical GPIO in accordance with certain aspects disclosed herein.

FIG. 15 illustrates adaptations of CCCs 1502, 1512 that may be used to distinguish VGI messages related to hardware-generated GPIO from VGI messages related to software events and software-generated physical GPIO in accordance with certain aspects disclosed herein. In a first example 1500, four bits 1504 of a CCC 1502 may be modified to provide VGI_ID values that may be used to manage VGI messages. In another example 1510, one or more sub-commands 1514 may be defined to manage VGI messages. In some instances, a sub-command 1514 may be defined for each entry in the table 1420. In some instances, the sub-command 1514 may include an 8-bit VGI_ID. In some instances, one or more sub-commands 1514 may identify the type of source that generated the corresponding VGI message, and the type of the consumer of the corresponding VGI message (i.e., hardware-monitored, software-monitored GPIO, software event). In other examples, one or more CCCs 1512 may be reserved and/or defined for each type of VGI message transfer (see crossbar mapping 1400, table 1420).

Other techniques may be employed to manage types of VGI message transfer. For example, the sources and destinations of VGI messages may be abstracted. Each source and destination of GPIO and/or software event may be preassigned a handler to be used for generating VGI messages and a handler for decoding received VGI messages. VGI messages may conformed to a format that can be handled by any handler in the receiver. A transmitter need not be aware of the type of decoding and/or conversion that is performed at the receiver.

In some instances, abstraction in a VGI exchange enables different types of devices to exchange VGI messages that include hardware-generated GPIO, VGI messages related to software events and software-generated physical GPIO. VGI messages may indicate the VGI origination point and the VGI destination point. Details of the VGI message handlers in source and destination devices can be preconfigured and/or encoded in VGI messages. In one example, an originating/terminating Execution Environment (EE) or Subsystem may include an ARM CPU, a digital signal processor (DSP) and/or a graphical processing unit (GPU). The subsystem may include a modem or an application processor. A software event transmitted in VGI messages from an ARM CPU can be identified to be directed to a hardware VGI handler in the modem.

Figure 16:
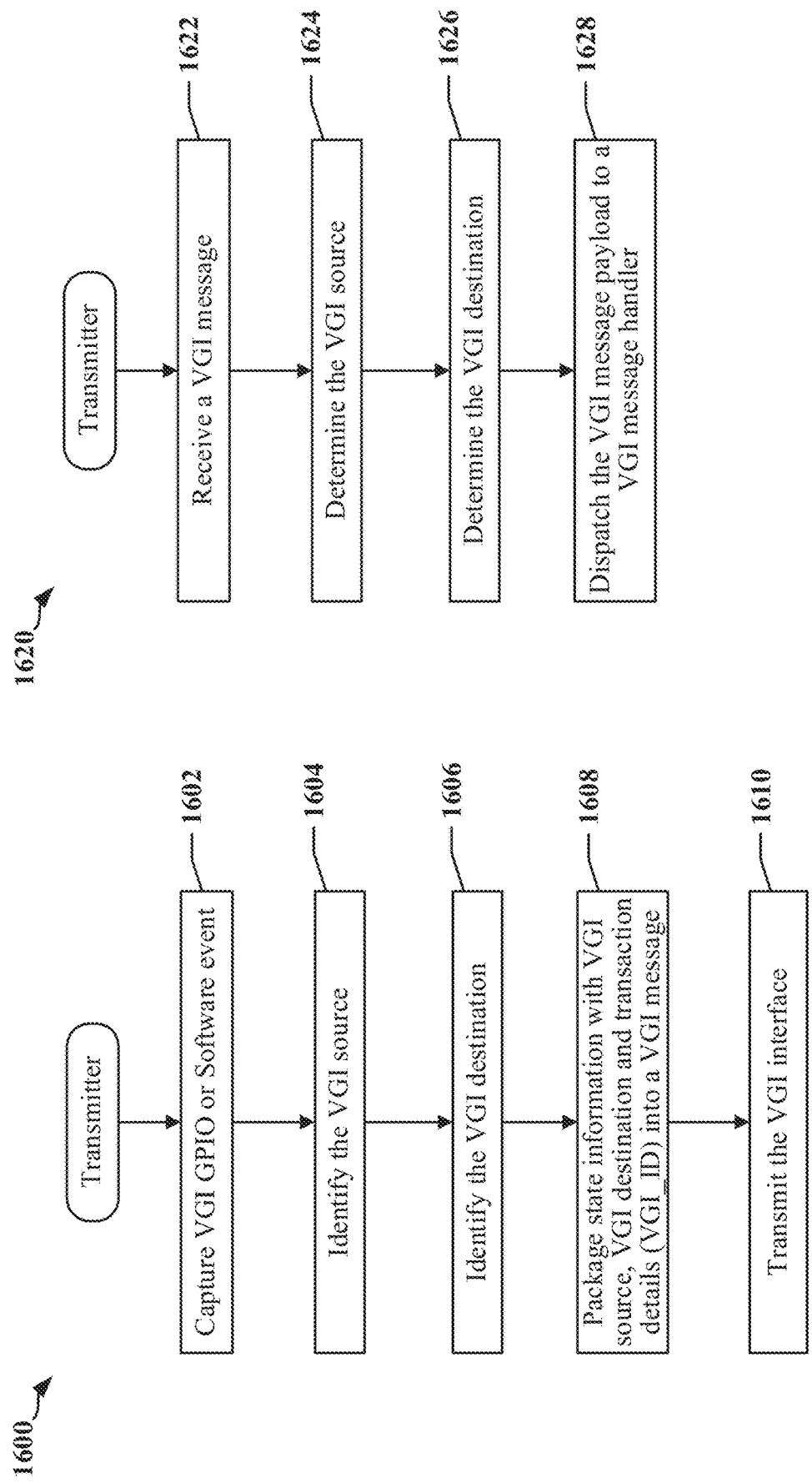
FIG. 16 includes first and second flowcharts that illustrate the operation of a system architected to implement heterogeneous VGI messaging in accordance with certain aspects disclosed herein.

FIG. 16 includes flowcharts 1600, 1620 that illustrate the operation of a system architected to implement heterogeneous VGI messaging. The first flowchart 1600 illustrates certain aspects related to the encoding and transmission of VGI messages. The VGI messages may be controlled or managed by a finite state machine. The finite state machine may be implemented as an always active front-end finite state machine (AAFE-FSM) that operates during idle, sleep and/or power-down periods.

At block 1602, the AAFE-FSM may capture a physical GPIO or software event. In some examples, the physical GPIO may be related to state of a software-initiated signal transmitted through a physical GPIO pin. At block 1604, the AAFE-FSM may identify the type of source of the physical GPIO or software event. The AAFE-FSM may represent the source as a value in a code word. In a first example, the code word has a value of 0 when the source is a hardware-generated physical GPIO, the code word has a value of 1 when the source is a software-initiated physical GPIO, and the code word has a value of 2 when the source is a software event. At block 1606, the AAFE-FSM may identify the type of destination of the VGI message. The AAFE-FSM may represent the destination as a value in a code word. In a first example, the code word has a value of 0 when the source is a hardware-generated physical GPIO, the code word has a value of 1 when the source is a software-initiated physical GPIO, and the code word has a value of 2 when the source is a software event.

The code word values used to represent types of source and destination may be selected from the same set of values or a different set of values. In the first example described in relation to blocks 1604 and 1606, the set of values may be represented as $Set_{Source\_Destination} = \{0, 1, 2\}$. In a second example, the set of values for the source may be represented as $Set_{source} = \{0, 1, 2\}$ and the set of values for the destination may be represented as $Set_{Destination} = \{8, 9, 10\}$. In a third example, a set of values representing the source and destination may be represented as the alphanumeric $Set_{source} = \{0, 1A, 1\}$. The code word values for source and destination may be used to generate a VGI_ID that characterizes the VGI transaction. In some instances, the AAFE-FSM may generate the VGI_ID without creating source and destination code words.

At block 1608, the AAFE-FSM may package a VGI payload representing state of the GPIO or software event into a VGI message together with the VGI_ID. At block 1610, the AAFE-FSM may transfer the VGI message across a serial bus.

The second flowchart 1620 illustrates certain aspects related to the reception and decoding of VGI messages. The VGI messages may be processed or otherwise handled by a finite state machine. The finite state machine may be implemented as an always active front-end finite state machine (AAFE-FSM) that operates during idle, sleep and/or power-down periods.

At block 1622, the AAFE-FSM may receive a VGI message. At block 1624, the AAFE-FSM may determine the VGI source based on the VGI_ID provided in the VGI message. At block 1626, the AAFE-FSM may determine the VGI destination based on the VGI_ID provided in the VGI message. At block 1628, the AAFE-FSM may dispatch the VGI payload for processing. The AAFE-FSM may select a VGI message handler configured to decode state information in the VGI payload and provide an output appropriate for the destination. For example, a first handler may be configured to update state of physical GPIO, a second handler may be configured to update state of physical GPIO that is monitored by software and a third handler may be configured to generate a software event. Each handler may be associated with a designated hardware subsystem, CPU, or EE.

The AAFE-FSM and one or more handlers may be adapted to map VGI messages to destination subsystems. The AAFE-FSM and one or more handlers may be adapted to convert state between different types of input and output, including physical GPIO and/or software events.

Certain aspects disclosed herein provide a common approach for communication hardware and software events between devices without using additional physical GPIO pins. All combinations of origination type to termination type may be supported, where origination types include hardware-originated GPIO, software-initiated physical GPIO and software event VGI sources and destination types include hardware-monitored GPIO, software-monitored physical GPIO and software event VGI consumers.

Certain aspects disclosed herein enable conversion between hardware and software events at source and/or destination of VGI messages. VGI-enabled conversion may be advantageously used to seamlessly convert hardware-originated GPIO generated in a first device to a software event delivered in a second device. VGI-enabled conversion may be advantageously used to seamlessly convert a software event generated in a first device to a hardware-monitored GPIO in a second device.

Examples of Processing Circuits and Methods

Figure 17:
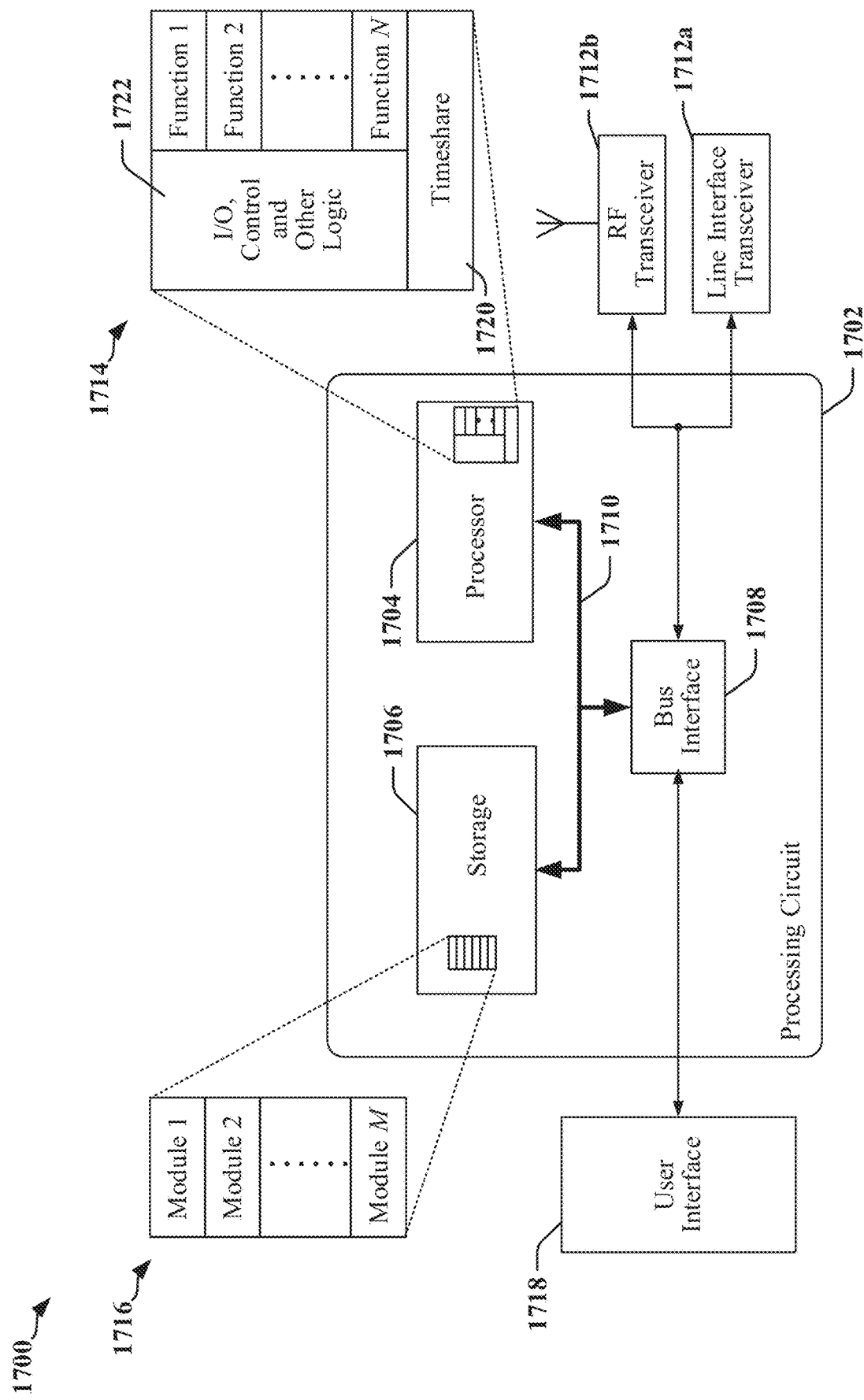
FIG. 17 illustrates one example of an apparatus employing a processing circuit that may be adapted according to certain aspects disclosed herein.

FIG. 17 is a diagram illustrating an example of a hardware implementation for an apparatus 1700 employing a finite state machine 810 to optimize virtual GPIO latency. In some examples, the apparatus 1700 may configure the operation of the finite state machine 810. In some examples, the apparatus 1700 may perform one or more functions disclosed herein. In accordance with various aspects of the disclosure, an element, or any portion of an element, or any combination of elements as disclosed herein may be implemented using a processing circuit 1702. The processing circuit 1702 may include one or more processors 1704 that are controlled by some combination of hardware and software modules. Examples of processors 1704 include microprocessors, microcontrollers, DSP, GPU, SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1704 may include specialized processors that perform specific functions, and that may be configured, augmented or controlled by one of the software modules 1716. The one or more processors 1704 may be configured through a combination of software modules 1716 loaded during initialization, and further configured by loading or unloading one or more software modules 1716 during operation.

In the illustrated example, the processing circuit 1702 may be implemented with a bus architecture, represented generally by the bus 1710. The bus 1710 may include any number of interconnecting buses and bridges depending on the specific application of the processing circuit 1702 and the overall design constraints. The bus 1710 links together various circuits including the one or more processors 1704, and storage 1706. Storage 1706 may include memory devices and mass storage devices, and may be referred to herein as computer-readable media and/or processor-readable media. The bus 1710 may also link various other circuits such as timing sources, timers, peripherals, voltage regulators, and power management circuits. A bus interface 1708 may provide an interface between the bus 1710 and one or more transceivers 1712*a*, 1712*b*. A transceiver 1712*a*, 1712*b* may be provided for each networking technology supported by the processing circuit. In some instances, multiple networking technologies may share some or all of the circuitry or processing modules found in a transceiver 1712*a*, 1712*b*. Each transceiver 1712*a*, 1712*b* provides a means for communicating with various other apparatus over a transmission medium. In one example, a transceiver 1712*a* may be used to couple the apparatus 1700 to a multi-wire bus. In another example, a transceiver 1712*b* may be used to connect the apparatus 1700 to a wireless network. Depending upon the nature of the apparatus 1700, a user interface 1718 (e.g., keypad, display, speaker, microphone, joystick) may also be provided, and may be communicatively coupled to the bus 1710 directly or through the bus interface 1708.

A processor 1704 may be responsible for managing the bus 1710 and for general processing that may include the execution of software stored in a computer-readable medium that may include the storage 1706. In this respect, the processing circuit 1702, including the processor 1704, may be used to implement any of the methods, functions and techniques disclosed herein. The storage 1706 may be used for storing data that is manipulated by the processor 1704 when executing software, and the software may be configured to implement any one of the methods disclosed herein.

One or more processors 1704 in the processing circuit 1702 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1706 or in an external computer-readable medium. The external computer-readable medium and/or storage 1706 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1706 may also include, by way of example, a carrier wave, a transmission line, and any other suitable medium for transmitting software and/or instructions that may be accessed and read by a computer. Computer-readable medium and/or the storage 1706 may reside in the processing circuit 1702, in the processor 1704, external to the processing circuit 1702, or be distributed across multiple entities including the processing circuit 1702. The computer-readable medium and/or storage 1706 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1706 may maintain software maintained and/or organized in loadable code segments, modules, applications, programs, etc., which may be referred to herein as software modules 1716. Each of the software modules 1716 may include instructions and data that, when installed or loaded on the processing circuit 1702 and executed by the one or more processors 1704, contribute to a run-time image 1714 that controls the operation of the one or more processors 1704. When executed, certain instructions may cause the processing circuit 1702 to perform functions in accordance with certain methods, algorithms and processes described herein.

Some of the software modules 1716 may be loaded during initialization of the processing circuit 1702, and these software modules 1716 may configure the processing circuit 1702 to enable performance of the various functions disclosed herein. For example, some software modules 1716 may configure internal devices and/or logic circuits 1722 of the processor 1704, and may manage access to external devices such as the transceiver 1712a, 1712b, the bus interface 1708, the user interface 1718, timers, mathematical coprocessors, and so on. The software modules 1716 may include a control program and/or an operating system that interacts with interrupt handlers and device drivers, and that controls access to various resources provided by the processing circuit 1702. The resources may include memory, processing time, access to the transceiver 1712a, 1712b, the user interface 1718, and so on.

One or more processors 1704 of the processing circuit 1702 may be multifunctional, whereby some of the software modules 1716 are loaded and configured to perform different functions or different instances of the same function. The one or more processors 1704 may additionally be adapted to manage background tasks initiated in response to inputs from the user interface 1718, the transceiver 1712a, 1712b, and device drivers, for example. To support the performance of multiple functions, the one or more processors 1704 may be configured to provide a multitasking environment, whereby each of a plurality of functions is implemented as a set of tasks serviced by the one or more processors 1704 as needed or desired. In one example, the multitasking environment may be implemented using a timesharing program 1720 that passes control of a processor 1704 between different tasks, whereby each task returns control of the one or more processors 1704 to the timesharing program 1720 upon completion of any outstanding operations and/or in response to an input such as an interrupt. When a task has control of the one or more processors 1704, the processing circuit is effectively specialized for the purposes addressed by the function associated with the controlling task. The timesharing program 1720 may include an operating system, a main loop that transfers control on a round-robin basis, a function that allocates control of the one or more processors 1704 in accordance with a prioritization of the functions, and/or an interrupt driven main loop that responds to external events by providing control of the one or more processors 1704 to a handling function.

Figure 18:
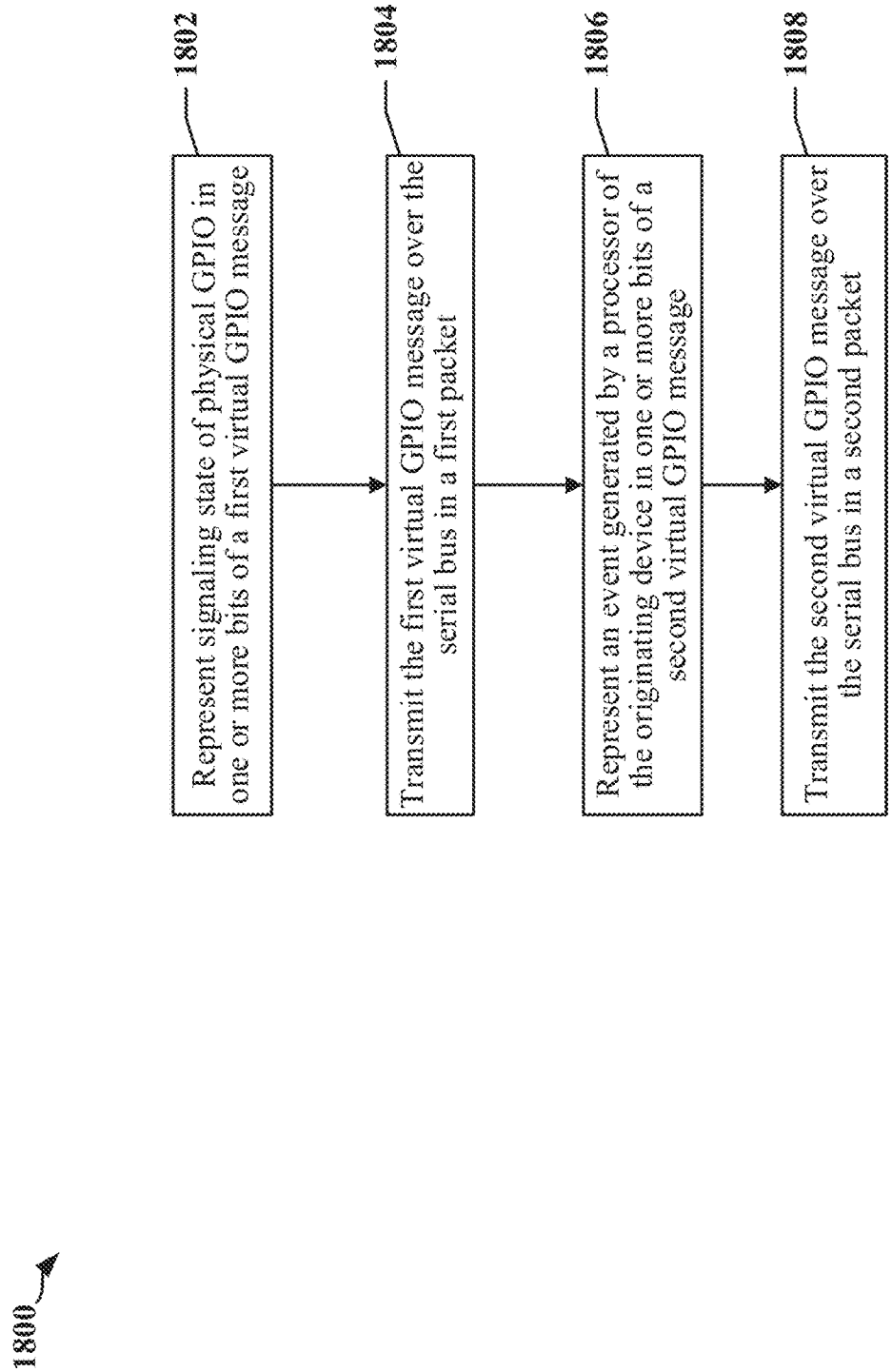
FIG. 18 is a third flowchart illustrating certain operations of an application processor adapted in accordance with certain aspects disclosed herein.

FIG. 18 is a flowchart 1800 of a method that may be performed at a device coupled to a serial bus. The device may be referred to herein as an originating device. Certain circuits involved in executing the method may be configured by a finite state machine. Additionally, or alternatively, a finite state machine may perform certain portions of the method.

At block 1802, the device may represent signaling state of physical GPIO in one or more bits of a first VGI message. At block 1804, the device may transmit the first VGI message over the serial bus in a first packet. At block 1806, the device may represent an event generated by a processor of the originating device in one or more bits of a second VGI message. At block 1808, the device may transmit the second VGI message over the serial bus in a second packet.

In certain examples, the device may determine a transaction identifier associated with the event. The transaction identifier indicates a source of the event and a destination of the event. The device may encode the transaction identifier in the second packet. The second packet is transmitted over the serial bus to the destination of the event. The transaction identifier may identify a physical GPIO pin as the destination of the event. In one example, the serial bus is operated in accordance with an I3C protocol, and the second packet includes a command code identifying the second packet as a VGI packet. The transaction identifier may be encoded in the command code, or in a sub-command code.

In some examples, the device may determine a transaction identifier associated with the first packet, where the transaction identifier indicates a physical GPIO pin as a source of the first VGI message and designates a consumer of software events as a destination of the first VGI message, and the device may transmit the transaction identifier in the first packet. In this example, the serial bus may be operated in accordance with an I3C protocol, the first packet may include a command code associated with VGI packets, and the transaction identifier may be encoded in the command code or a sub-command code.

In one or more examples, the device may determine a transaction identifier associated with the first packet, where the transaction identifier indicates a software-controlled GPIO pin as source of the first VGI message and designates a consumer of software events to be a destination of the first VGI message. The first packet may include the transaction identifier. In this example, the serial bus may be operated in accordance with an I3C protocol, the first packet may include a command code associated with VGI packets, and the transaction identifier may be encoded in the command code or a sub-command code.

Figure 19:
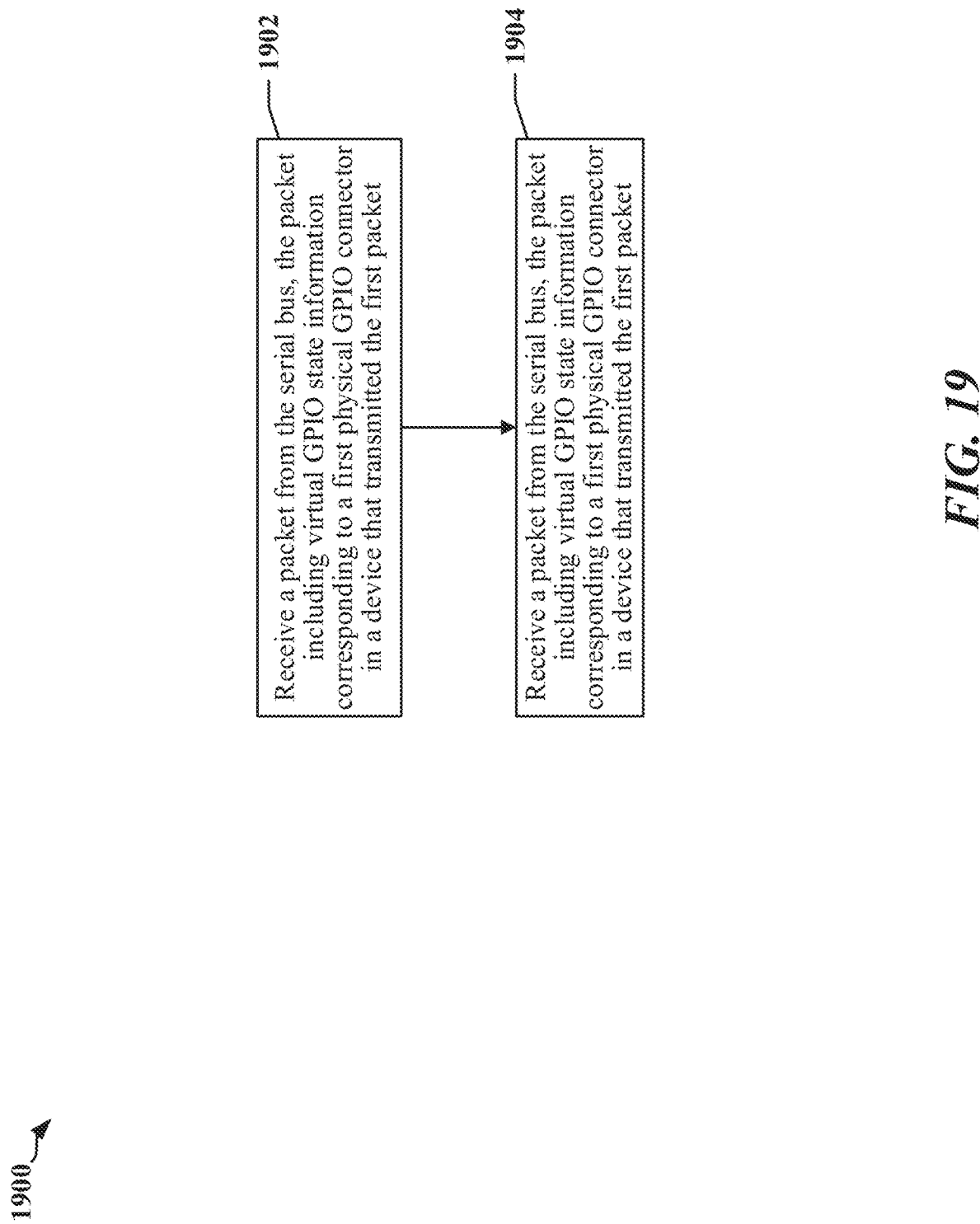
FIG. 19 is a fourth flowchart illustrating certain operations of an application processor adapted in accordance with certain aspects disclosed herein.

FIG. 19 is a flowchart 1900 of a method that may be performed at a device coupled to a serial bus. The device may be referred to herein as a destination device. Certain circuits involved in executing the method may be configured by a finite state machine. Additionally, or alternatively, a finite state machine may perform certain portions of the method.

At block 1902, the device may receive a packet from the serial bus. The packet may include virtual GPIO state information corresponding to a first physical GPIO connector in a device that transmitted the first packet. At block 1904, the device may generate a software event to be processed by the destination device in response to the virtual GPIO state information in the packet. In some instances, the device may decode a transaction identifier provided in the packet. The device may provide virtual GPIO state information extracted from the packet to a software event handler based on information encoded in the transaction identifier. The serial bus may be operated in accordance with an I3C protocol. The packet may include a command code identifying the packet as a virtual GPIO packet. The transaction identifier may be encoded in the command code. The transaction identifier may be encoded in a sub-command code.

Figure 20:
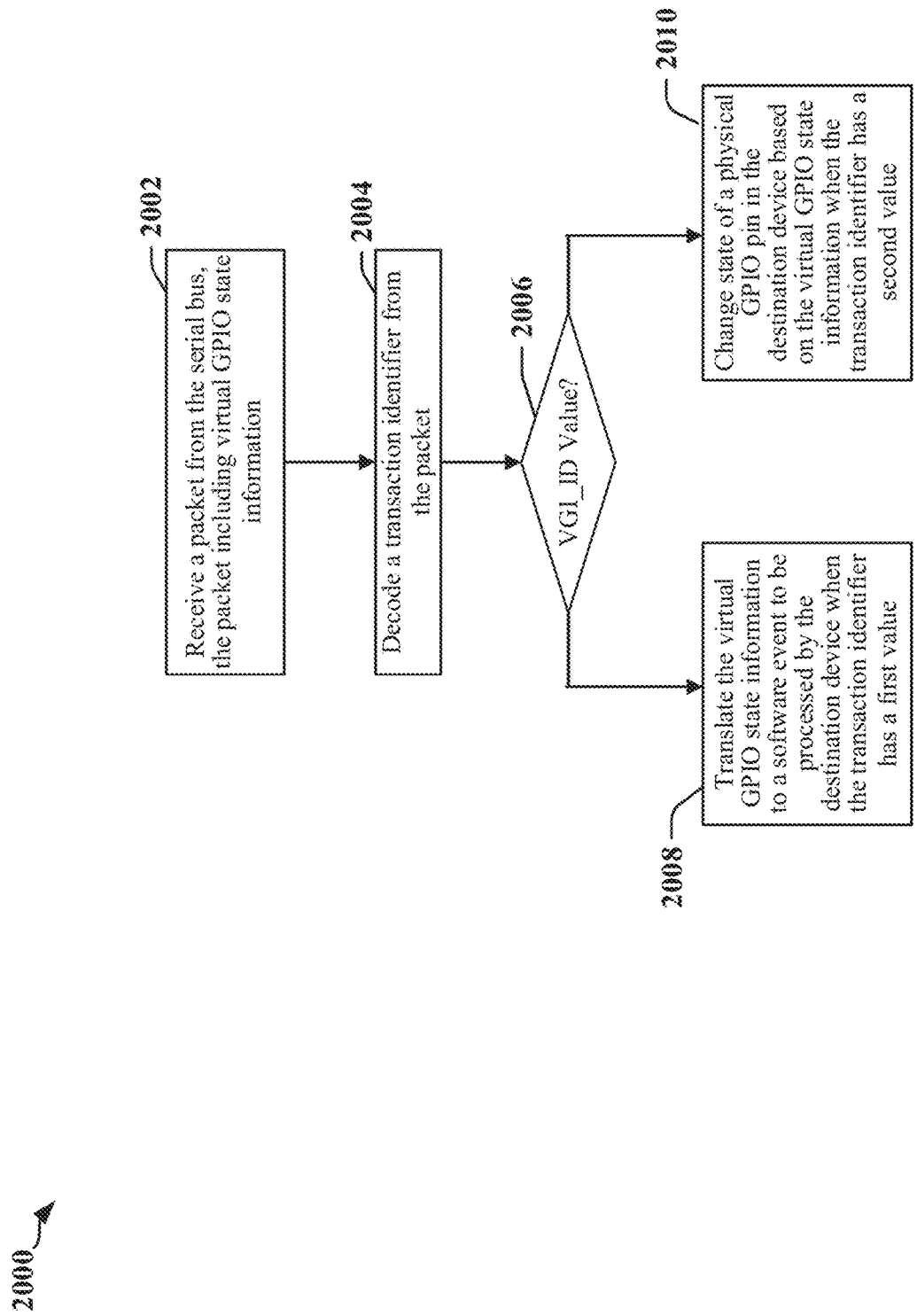
FIG. 20 is a fifth flowchart illustrating certain operations of an application processor adapted in accordance with certain aspects disclosed herein.

FIG. 20 is a flowchart 2000 of a method that may be performed at a device coupled to a serial bus. The device may be referred to herein as a destination device. Certain circuits involved in executing the method may be configured by a finite state machine. Additionally, or alternatively, a finite state machine may perform certain portions of the method.

At block 2002, the device may receive a packet from the serial bus, the packet including VGI state information. At block 2004, the device may decode a transaction identifier provided in the packet. At block 2006, the device may determine whether the transaction identifier relates to physical GPIO or a software event. At block 2008, the device may translate the VGI state information to a software event to be processed by the destination device when the transaction identifier has a first value. At block 2010, the device may change state of a physical GPIO pin in the destination device based on the VGI state information when the transaction identifier has a second value.

In certain examples, the serial bus is operated in accordance with an I3C protocol, and wherein the packet includes a command code identifying the packet as a VGI packet. In some instances, the transaction identifier is encoded in the command code. In other instances, the transaction identifier may be encoded in a sub-command code.

In one example, the device may provide the VGI state information in the packet to a software event handler when the transaction identifier has the first value. In some instances, the state of the first physical GPIO pin is controlled by a processor in a device that transmitted the packet. In some instances, the physical GPIO pin in the destination device is monitored by a processor in the destination device. In some instances, the physical GPIO pin in the destination device controls a function of a circuit in the destination device.

The serial bus may be operated in accordance with an I3C protocol, and wherein the packet includes a command code identifying the packet as a VGI packet, where the transaction identifier is encoded in the command code or in a sub-command code.

Figure 21:
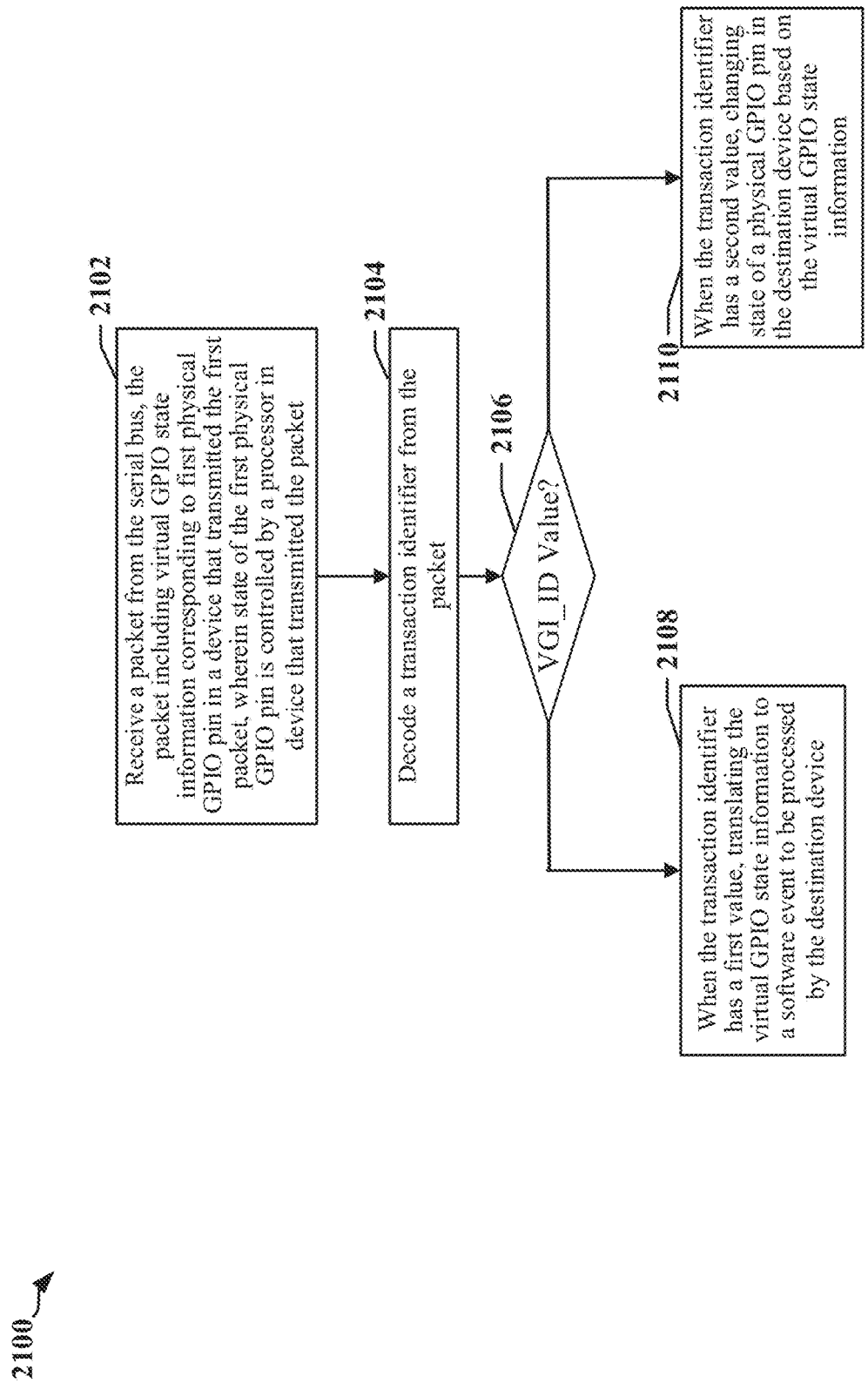
FIG. 21 is a sixth flowchart illustrating certain operations of an application processor adapted in accordance with certain aspects disclosed herein.

FIG. 21 is a flowchart 2100 of a method that may be performed at a device coupled to a serial bus. The device may be referred to herein as a destination device. Certain circuits involved in executing the method may be configured by a finite state machine. Additionally, or alternatively, a finite state machine may perform certain portions of the method.

At block 2102, the device may receive a packet from the serial bus, the packet including virtual GPIO state information corresponding to a first physical GPIO pin in a device that transmitted the first packet, wherein state of the first physical GPIO pin is controlled by a processor in device that transmitted the packet. At block 2104, the device may decode a transaction identifier from the packet. At block 2106, the device may determine how to process the payload of the packet based on the value of the transaction identifier. At block 2108, the transaction identifier is determined to have a first value, and the device may translate the virtual GPIO state information to a software event to be processed by the destination device. At block 2110, the transaction identifier is determined to have a second value, and the device may change state of a physical GPIO pin in the destination device based on the virtual GPIO state information.

In some instances, the physical GPIO pin in the destination device is monitored by a processor in the destination device. In some instances, the physical GPIO pin in the destination device controls a function of a circuit in the destination device. The serial bus may be operated in accordance with an I3C protocol. The packet may include a command code identifying the packet as a virtual GPIO packet. The transaction identifier may be encoded in the command code. The transaction identifier may be encoded in a sub-command code.

Figure 22:
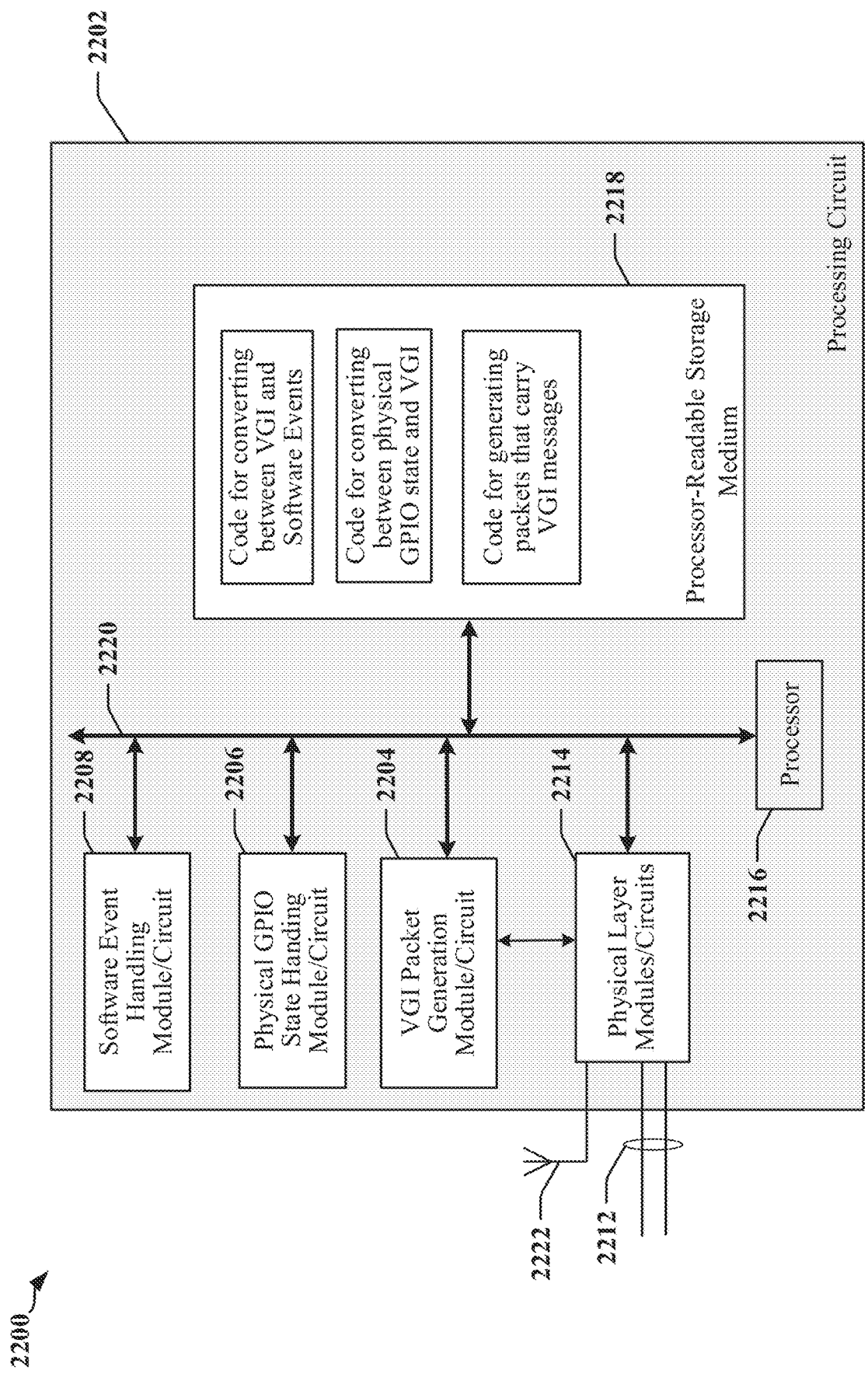
FIG. 22 illustrates a first example of a hardware implementation for an apparatus adapted in accordance with certain aspects disclosed herein.

FIG. 22 is a diagram illustrating a simplified example of a hardware implementation for an apparatus 2200 employing a processing circuit 2202. The apparatus may implement a bridging circuit in accordance with certain aspects disclosed herein. The processing circuit typically has a controller or processor 2216 that may include one or more microprocessors, microcontrollers, digital signal processors, sequencers and/or state machines. The processing circuit 2202 may be implemented with a bus architecture, represented generally by the bus 2220. The bus 2220 may include any number of interconnecting buses and bridges depending on the specific application of the processing circuit 2202 and the overall design constraints. The bus 2220 links together various circuits including one or more processors and/or hardware modules, represented by the controller or processor 2216, the modules or circuits 2204, 2206 and 2208, and the processor-readable storage 2218. One or more physical layer circuits and/or modules 2214 may be provided to support communications over a communication link implemented using a multi-wire bus 2212, through an antenna 2222 (to a wireless network for example), and so on. The bus 2220 may also link various other circuits such as timing sources, peripherals, voltage regulators, and power management circuits, which are well known in the art, and therefore, will not be described any further.

The processor 2216 is responsible for general processing, including the execution of software, code and/or instructions stored on the processor-readable storage 2218. The processor-readable storage 2218 may include a non-transitory storage medium. The software, when executed by the processor 2216, causes the processing circuit 2202 to perform the various functions described supra for any particular apparatus. The processor-readable storage medium may be used for storing data that is manipulated by the processor 2216 when executing software. The processing circuit 2202 further includes at least one of the modules 2204, 2206 and 2208. The modules 2204, 2206 and 2208 may be software modules running in the processor 2216, resident/stored in the processor-readable storage 2218, one or more hardware modules coupled to the processor 2216, or some combination thereof. The modules 2204, 2206 and 2208 may include microcontroller instructions, state machine configuration parameters, or some combination thereof.

In one configuration, the apparatus 2200 includes modules and/or circuits 2206, 2208 configured to operate as handlers for VGI messages associated with physical GPIO and software events, respectively. The apparatus 2200 may include modules and/or circuits 2204 configured to generate packets that include VGI messages, source and destination information and types of events (e.g., physical GPIO, software events, software-initiated hardware, software-monitored hardware GPIO, etc.).

In one example, the apparatus 2200 includes a serial bus, an originating device coupled to the serial bus, and a destination device coupled to the serial bus. The originating device may have a finite state machine configured to generate a first virtual GPIO packet that carries a payload representative of signaling state of physical GPIO in the originating device, transmit the first virtual GPIO packet on the serial bus, generate a second virtual GPIO packet that carries a payload representative of an event generated by a processor in the originating device, and transmit the second virtual GPIO packet on the serial bus. The destination device may have a finite state machine configured to receive the second virtual GPIO packet from the serial bus, and communicate the event to a processor of the destination device or modify signaling state of physical GPIO in the destination device in accordance with the payload of the second virtual GPIO packet.

The processor-readable storage 2218 may include code executable by the processor 2216. In a first example, the processor-readable storage 2218 includes code for representing signaling state of physical GPIO in one or more bits of a first VGI message, transmitting the first VGI message over the serial bus in a first packet, representing an event generated by a processor of the originating device in one or more bits of a second VGI message, and transmitting the second VGI message over the serial bus in a second packet.

The processor-readable storage 2218 may include code for determining a transaction identifier associated with the event. The transaction identifier indicates a source of the event and a destination of the event. The processor-readable storage 2218 may include code for encoding the transaction identifier in the second packet, where the second packet is transmitted over the serial bus to the destination of the event.

In some examples, the transaction identifier identifies a physical GPIO pin as the destination of the event. The serial bus may be operated in accordance with an I3C protocol, and the second packet may include a command code identifying the second packet as a VGI packet. The transaction identifier may be encoded in the command code or in a sub-command code.

In some examples, the processor-readable storage 2218 may include code for determining a transaction identifier associated with the first packet, where the transaction identifier indicates a physical GPIO pin as a source of the first VGI message and designates a consumer of software events as a destination of the first VGI message, and code for transmitting the transaction identifier in the first packet.

In some examples, the serial bus is operated in accordance with an I3C protocol, wherein the first packet includes a command code associated with VGI packets. The transaction identifier may be encoded in the command code or a sub-command code.

In some examples, the processor-readable storage 2218 may include code for determining a transaction identifier associated with the first packet, where the transaction identifier indicates a software-controlled GPIO pin as source of the first VGI message and designates a consumer of software events to be a destination of the first VGI message, and where the first packet includes the transaction identifier. The serial bus may be operated in accordance with an I3C protocol, where the first packet includes a command code associated with VGI packets, and where the transaction identifier is encoded in the command code or a sub-command code.

In a second example, the apparatus is a receiving device and the processor-readable storage 2218 includes code for receiving a packet from the serial bus, the packet including VGI state information. The processor-readable storage 2218 may include code for decoding a transaction identifier provided in the packet, translating the VGI state information to a software event to be processed by the destination device when the transaction identifier has a first value, and changing state of a physical GPIO pin in the destination device based on the VGI state information when the transaction identifier has a second value. The serial bus may be operated in accordance with an I3C protocol, where the packet includes a command code identifying the packet as a VGI packet. The transaction identifier may be encoded in the command code or in a sub-command code.

In some examples, the processor-readable storage 2218 may include code for providing the VGI state information in the packet to a software event handler when the transaction identifier has the first value. The state of the first physical GPIO pin may be controlled by a processor in a device that transmitted the packet. The physical GPIO pin in the destination device may be monitored by a processor in the destination device. The physical GPIO pin in the destination device may control a function of a circuit in the destination device. The serial bus may be operated in accordance with an I3C protocol, and the packet may include a command code identifying the packet as a VGI packet.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for data communication performed at an originating device coupled to a serial bus, comprising:
representing signaling state of physical general-purpose input/output (GPIO) in one or more bits of a first virtual GPIO message;
transmitting the first virtual GPIO message over the serial bus in a first packet, wherein the first packet includes a first transaction identifier that characterizes the first virtual GPIO message;
representing an event generated by a processor of the originating device in one or more bits of a second virtual GPIO message; and
transmitting the second virtual GPIO message over the serial bus in a second packet, wherein the second packet includes a second transaction identifier that characterizes the second virtual GPIO message,
wherein the serial bus is operated in accordance with an I3C protocol, and wherein each of the first packet and the second packet includes a corresponding command code identifying each packet as a virtual GPIO packet.

2. The method of claim 1, further comprising:
configuring the second transaction identifier to indicate a source of the event and a destination of the event; and
encoding the second transaction identifier in the second packet,
wherein the second packet is transmitted over the serial bus to the destination of the event.

3. The method of claim 2, wherein the second transaction identifier identifies a physical GPIO pin as the destination of the event.

4. The method of claim 2, wherein the second transaction identifier is encoded in a command code that is transmitted in the second packet.

5. The method of claim 2, wherein the second transaction identifier is encoded in a sub-command code that is transmitted in the second packet.

6. The method of claim 1, further comprising:
configuring the first transaction identifier to indicate a physical GPIO pin as a source of the first virtual GPIO message and to designate a consumer of software events as a destination of the first virtual GPIO message; and
transmitting the first transaction identifier in the first packet.

7. The method of claim 6, wherein the first transaction identifier is encoded in a command code or a sub-command code that is transmitted in the first packet.

8. The method of claim 1, further comprising:
configuring the first transaction identifier to indicate a software-controlled GPIO pin as a source of the first virtual GPIO message and to designate a consumer of software events as a destination of the first virtual GPIO message.

9. The method of claim 8, wherein the first transaction identifier is encoded in a command code or a sub-command code that is transmitted in the first packet.

10. A method for data communication performed at a destination device coupled to a serial bus, comprising:
receiving a packet from the serial bus, the packet including virtual general-purpose input/output (GPIO) state information;
decoding a transaction identifier provided in the packet;
translating the virtual GPIO state information to a software event to be processed by the destination device when the transaction identifier has a first value; and
changing state of a physical GPIO pin in the destination device based on the virtual GPIO state information when the transaction identifier has a second value,
wherein the serial bus is operated in accordance with an I3C protocol, and wherein the packet includes a command code identifying the packet as a virtual GPIO packet.

11. The method of claim 10, wherein the transaction identifier is encoded in the command code.

12. The method of claim 10, wherein the transaction identifier is encoded in a sub-command code.

13. The method of claim 10, further comprising:
providing the virtual GPIO state information in the packet to a software event handler when the transaction identifier has the first value.

14. The method of claim 10, wherein the state of the physical GPIO pin is controlled by a processor in a device that transmits the packet.

15. The method of claim 10, wherein the physical GPIO pin in the destination device is monitored by a processor in the destination device.

16. The method of claim 10, wherein the physical GPIO pin in the destination device controls a function of a circuit in the destination device.

17. A non-transitory processor-readable storage medium comprising code for:
representing signaling state of physical general-purpose input/output (GPIO) in one or more bits of a first virtual GPIO message;
transmitting the first virtual GPIO message over a serial bus in a first packet, wherein the first packet includes a first transaction identifier that characterizes the first virtual GPIO message;
representing an event generated by a processor of an originating device in one or more bits of a second virtual GPIO message; and
transmitting the second virtual GPIO message over the serial bus in a second packet, wherein the second packet includes a second transaction identifier that characterizes the second virtual GPIO message, wherein the serial bus is operated in accordance with an I3C protocol, and wherein each of the first packet and the second packet includes a corresponding command code identifying each packet as a virtual GPIO packet.

18. The storage medium of claim 17, further comprising code for:

configuring the second transaction identifier to indicate a source of the event and a destination of the event; and encoding the second transaction identifier in the second packet, wherein the second packet is transmitted over the serial bus to the destination of the event.

19. The storage medium of claim 18, wherein the second transaction identifier identifies a physical GPIO pin as the destination of the event.

20. The storage medium of claim 18, wherein the second transaction identifier is encoded in a command code that is transmitted in the second packet.

21. The storage medium of claim 18, wherein the second transaction identifier is encoded in a sub-command code that is transmitted in the second packet.

22. The storage medium of claim 17, further comprising code for:

configuring the first transaction identifier to indicate a physical GPIO pin as a source of the first virtual GPIO message and to designate a consumer of software events as a destination of the first virtual GPIO message; and transmitting the first transaction identifier in the first packet.

23. The storage medium of claim 22, wherein the first transaction identifier is encoded in a command code or a sub-command code that is transmitted in the first packet.

24. The storage medium of claim 17, further comprising code for:

configuring the first transaction identifier to indicate a software-controlled GPIO pin as a source of the first virtual GPIO message and to designate a consumer of software events as a destination of the first virtual GPIO message.

25. The storage medium of claim 24, wherein the first transaction identifier is encoded in a command code or a sub-command code that is transmitted in the first packet.

26. A data communication apparatus comprising:

a serial bus;

an originating device coupled to the serial bus, wherein a finite state machine in the originating device is configured to:

generate a first virtual general-purpose input/output (GPIO) packet that carries a first payload representative of signaling state of physical GPIO in the originating device;

transmit the first virtual GPIO packet over the serial bus, wherein the first virtual GPIO packet includes a first transaction identifier that characterizes the first payload;

generate a second virtual GPIO packet that carries a second payload representative of an event generated by a processor in the originating device; and transmit the second virtual GPIO packet over the serial bus, wherein the second virtual GPIO packet includes a second transaction identifier that characterizes the second payload; and a destination device coupled to the serial bus, wherein a finite state machine in the destination device is configured to:

receive the second virtual GPIO packet from the serial bus; and communicate the event to a processor of the destination device or modify signaling state of physical GPIO in the destination device in accordance with the second payload, wherein the serial bus is operated in accordance with an I3C protocol, and wherein each of virtual GPIO packets includes a corresponding command code identifying a payload of each virtual GPIO packet.

* * * * *